United States Patent [19]  
Reed et al.

[11] 3,973,391  
[45] Aug. 10, 1976

[54] CONTROL APPARATUS FOR MODULATING THE INLET GUIDE VANES OF A GAS TURBINE EMPLOYED IN A COMBINED CYCLE ELECTRIC POWER GENERATING PLANT AS A FUNCTION OF LOAD OR INLET BLADE PATH TEMPERATURE

[75] Inventors: Terry J. Reed, North Huntingdon; Jack R. Smith, Pittsburgh, both of Pa.

[73] Assignee: Westinghouse Electric Corporation, Pittsburgh, Pa.

[22] Filed: Aug. 8, 1974

[21] Appl. No.: 495,727

[52] U.S. Cl. .................... 60/39.29; 60/39.18 B; 60/39.28 R; 60/39.27; 290/40 C
[51] Int. Cl.² .......................................... F02C 9/14
[58] Field of Search ........... 60/39.29, 39.2, 39.18 R, 60/39.18 B; 290/40 A, 40 B, 40 C; 415/10, 17, 27

[56] References Cited
UNITED STATES PATENTS

| | | | |
|---|---|---|---|
| 3,255,586 | 6/1966 | Hennig | 60/39.27 X |
| 3,533,236 | 10/1970 | Cottington | 60/39.28 R |
| 3,653,206 | 4/1972 | Greune | 60/39.28 T |
| 3,691,405 | 9/1972 | Kendell | 60/39.28 T |
| 3,764,785 | 10/1973 | Harner | 60/39.28 R |
| 3,795,104 | 3/1974 | McLean | 60/39.29 X |
| 3,797,233 | 3/1974 | Webb | 60/39.28 R |

*Primary Examiner*—Clarence R. Gordon
*Attorney, Agent, or Firm*—S. A. Seinberg

[57] ABSTRACT

A combined cycle electric power generating plant, which includes gas and steam turbines, inlet guide vane positioning means for the gas turbines, steam generators, afterburners and a digital/analog control system, is provided with inlet guide vane control apparatus adapted to modulate the position of the inlet guide vanes as a function of load or inlet blade path temperature. The inlet guide vane control apparatus is further adapted to operate in either an automatic or manual mode with additional provision for bumpless transfer therebetween incorporated in the control apparatus.

42 Claims, 28 Drawing Figures

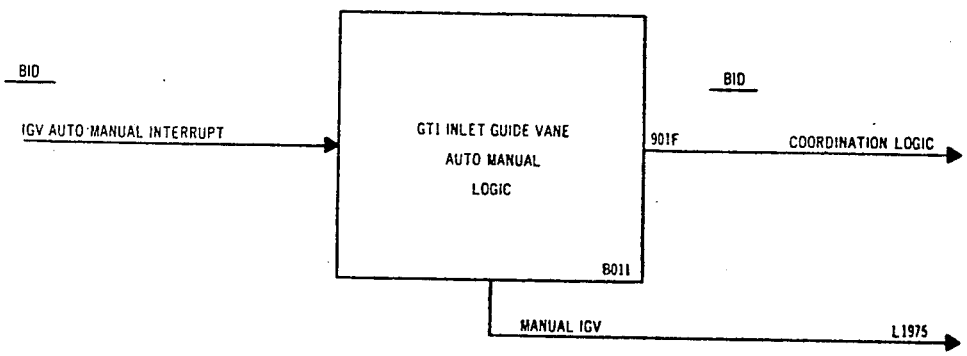
FIG.17A
FIG.17B
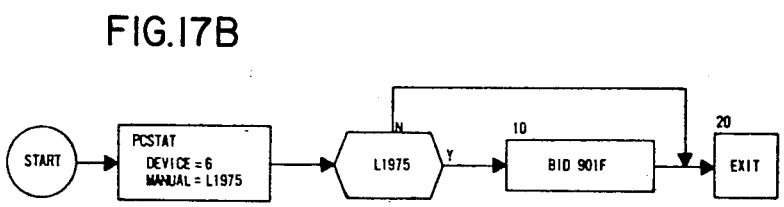

CONTROL APPARATUS FOR MODULATING THE INLET GUIDE VANES OF A GAS TURBINE EMPLOYED IN A COMBINED CYCLE ELECTRIC POWER GENERATING PLANT AS A FUNCTION OF LOAD OR INLET BLADE PATH TEMPERATURE

CROSS-REFERENCE TO RELATED APPLICATIONS

Reference is made to the following patent applications:

1. Ser. No. 399,790, filed on Sept. 21, 1973 by L. F. Martz, R. W. Kiscaden and R. Uram, entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control Systems Therefor", assigned to the present assignee and hereby incorporated by reference;

2. Ser. No. 319,114, 114, filed by T. Giras and J. Reuther on Dec. 29, 1972 as a continuation of an earlier filed application Ser. No. 082,470, entitled "An Improved System And Method For Operating Industrial Gas Turbine Apparatus And Gas Turbine Electric Power Plants Preferably With A Digital Computer Control System" and assigned to the present assignee, and related cases referred to therein;

3. Ser. No. 371,625, filed on June 20, 1973 by R. Yannone and R. A. Shields, entitled "Gas Turbine Power Plant Control Apparatus Having A Multiple Backup Control System", and assigned to the present assignee, and related cases referred to therein;

4. Ser. No. 495,765 filed concurrently herewith by Lyle F. Martz and Richard J. Plotnick, entitled "Combined Cycle Electric Power Plant Having A Control System Which Enables Dry Stream Generator Operation During Gas Turbine Operation", assigned to the present assignee and hereby incorporated by reference;

5. Ser. No. 495,731 filed concurrently herewith by J. R. Smith, entitled "Control Apparatus For Matching The Exhaust Flow Of A Gas Turbine Employed In A Combined Cycle Electric Power Generating Plant To The Requirements Of A Steam Generator Also Employed Therein", and assigned to the present assignee; and 6. Ser. No. 323,593 filed on Jan. 15, 1973, now U.S. Pat. No. 3,891,915, by R. Yannone and R. W. Kiscaden as a continuation of an earlier filed application Ser. No. 189,632, and now abandoned entitled "Improved Digital Computer Control System And Method For Monitoring And Controlling Operation Of Industrial Gas Turbine Apparatus To Drive Simultaneously An Electric Power Plant Generator And Provide Exhaust Gases To An Industrial Process", and assigned to the present assignee.

BACKGROUND OF THE INVENTION

The present invention relates to combined cycle electric power generating plants and, more particularly, to inlet guide vane modulations of the vanes of the gas turbines included therein. Further, the present invention relates to inlet guide vane control apparatus adapted to modulate the gas turbine guide vanes either automatically or manually having further provision for bumpless transfer therebetween.

In the operation of combined cycle and other electric generating power plants which employ at least one gas turbine, it is desirable to achieve maximized operating efficiencies or high heat rates. Ordinarily, gas turbines are operated at base load because of poor heat rates at reduced load. However, in the combined cycle plant or in the case of larger gas turbines, reduced load operation of the gas turbine is often a necessity since the full generating capability of the plant or turbine is not always required. Consequently, modulating the inlet guide vanes of the gas turbine at reduced loads is undertaken in order to improve heat rate and increase the gas turbine exhaust temperature, which increase is then utilized to supplement the afterburner and steam generator functions.

The modulation of the inlet guide vanes of a gas turbine for differing purposes is known. For example, in the aforementioned application Ser. No. 323,593, the inlet guide vanes are positionally controlled to hold gas turbine exhaust temperature at a constant value over its operating range in order to simultaneously generate power and drive an external, unrelated process. In particular, such operation is achieved as a function of a temperature control loop and the combustor shell pressure. In U.S. Pat. No. 3,623,326 issued to C. Greune on November 30, 1971, inlet guide vane modulation is utilized to maintain a constant, high exhaust gas temperature, both during acceleration and in steady-state performance of a gas turbine driven vehicle. In particular, such control is effected as a function of throttle position. Reference may also be had to commonly assigned and copending application Serial No. 319,114 and the related cases cited therein for a further example of inlet guide vane regulation as a function of speed.

None of these prior art arrangements are particularly suitable for use in a combined cycle generating plant. Neither are any of the known alternative schemes as is perhaps best exemplified by U.S. Pat. No. 3,097,486 issued to R. Roe on July 16, 1963. In the Roe patent, the entire exhaust of the gas turbine is delivered to a steam furnace for utilization therein as a function of speed or air flow control means which sense the plant power demands. Thus, as load demand on the system varies and the compressor output is regulated by the speed or air flow control means, the rate of flow through the furnace is regulated such that the higher the loading, the higher the exhaust temperature of the turbine and, conversely, the lower the loading, the cooler the exhaust temperature.

In order to improve heat rates and increase the overall plant efficiency, it is necessary at lower gas turbine loading to utilize exhaust temperature as a supplemental heating source for steam generation. While the Roe patent comes closest to this, it and the other known prior art arrangements do not satisfactorily achieve the desired result.

It should be noted that the description and understanding of the prior art discussed hereinabove is made in good faith and on the representation that the prior art referred to or considered may not be the most pertinent or that the conclusions desired are unrebuttable.

SUMMARY OF THE INVENTION

In a combined cycle electric power generating plant which includes a gas turbine having a variable inlet guide vane assembly and an actuating mechanism therefor, inlet guide vane control apparatus is provided for modulating the position of the vanes. The inlet guide vane control apparatus is adapted to function in either an automatic or a manual mode with additional provision included for bumpless transfer therebetween incorporated therein.

The inlet guide vane control apparatus is provided with means for automatically controlling the position of the inlet guide vanes wherein two function generators each characterize a predetermined gas turbine parameter to generate an inlet guide vane positioning control signal. During the automatic mode of operation, the higher of the two control signals is selected for utilization. Further provision allows the apparatus to control guide vane positioning with respect to a third turbine parameter until such time as a predetermined loading or speed value is reached.

Furthermore, the inlet guide vane control apparatus is also adapted for operation in a manual mode and is additionally equipped with interfacing and logic means for effecting bumpless transfer between the two modes of operation. To accomplish this, the interfacing means is also adapted to facilitate tracking of the positioning signal generated by the control apparatus when in the manual mode.

BRIEF DESCRIPTION OF THE DRAWINGS

FIGS. 17A–B illustrate an automatic/manual logic chain employed in the utilization of the present invention;

DESCRIPTION OF THE PREFERRED EMBODIMENT

A. General Plant Description

Figure 1:
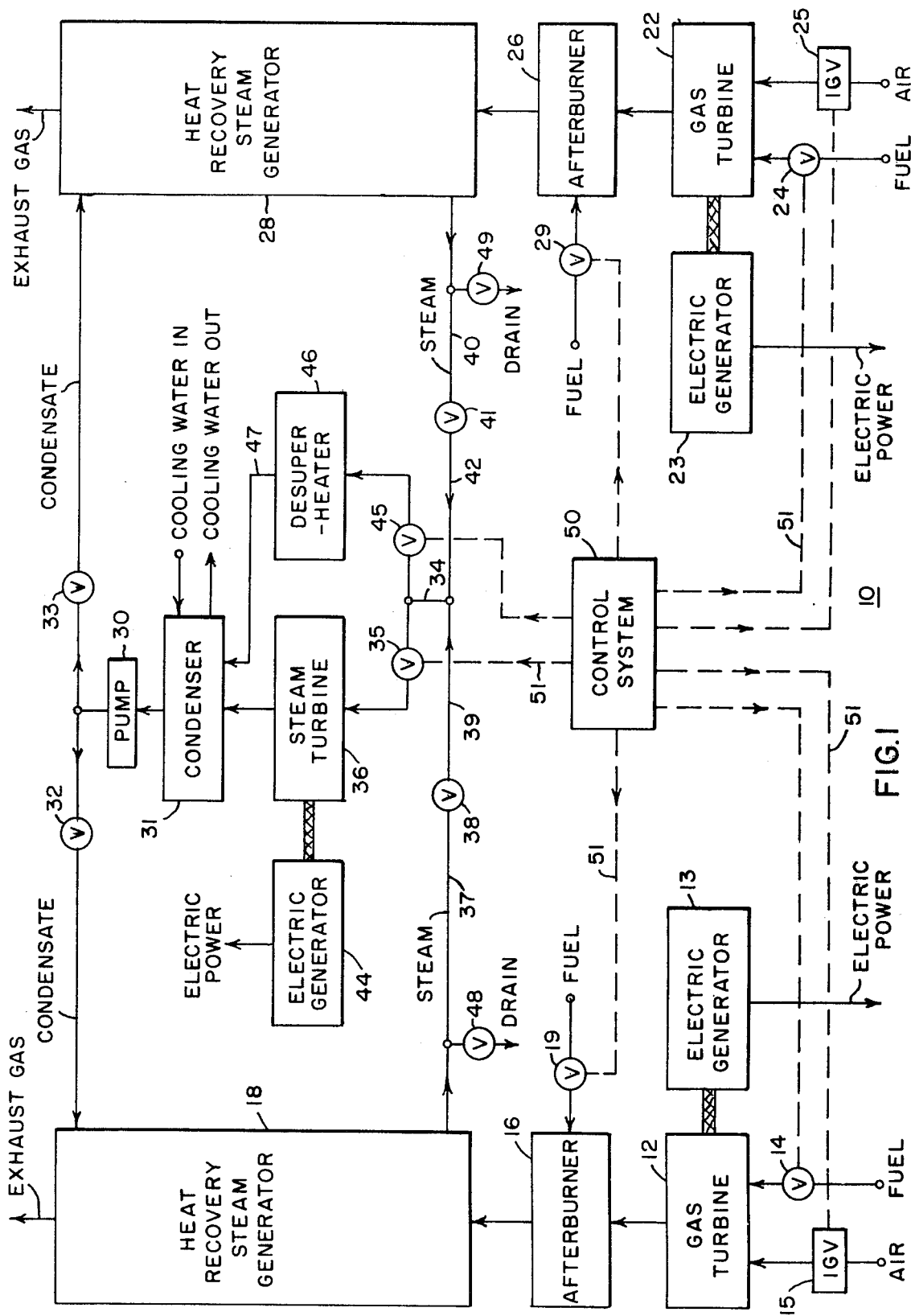
FIG. 1 illustrates a functional block diagram of a combined cycle electric power plant in which there is employed a gas turbine, the inlet guide vanes of which are controlled in accordance with the principles of the present invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as gas turbine No. 1) which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as heat recovery steam generator No. 1) includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as gas turbine No. 2) which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as heat recovery steam generator No. 2) includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the stream generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condenstate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance puposes, then its associated steam generator 18 can be removed from the system by closing its condensate flow valve 32 and its steam isolation valve 38. When, on the other hand, steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated withe the steam generator in a dry condition.

The combined cycle plant 10 affords a high degree of reliability in that failure of any one of the major apparatus components will not reduce total plant power generation capacity by more 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59°Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply system have been omitted from FIG. 1 for the sake of simplicity. Other simplifications employed in FIG. 1 are of a similar character.

Figure 2:
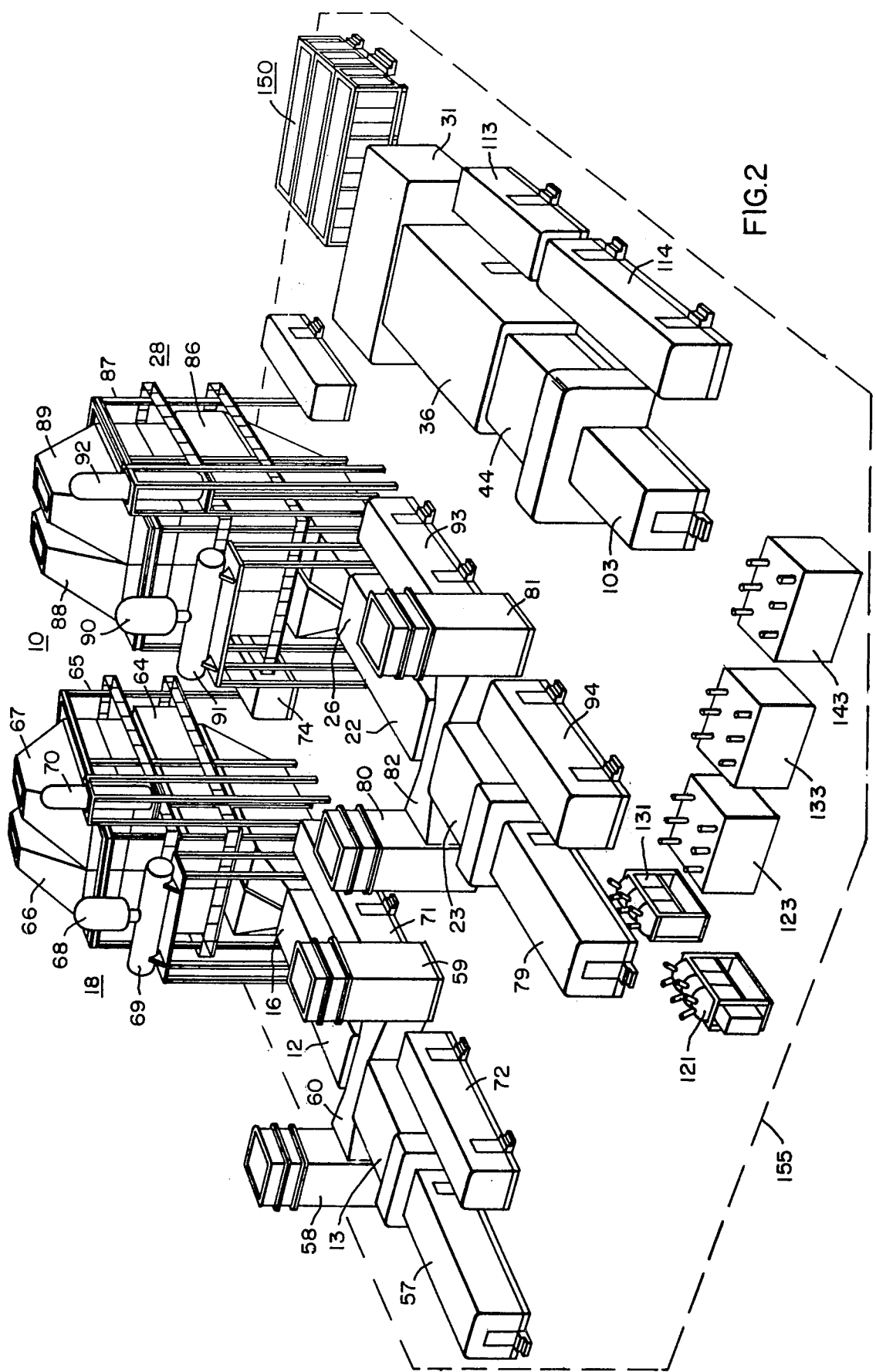
FIG. 2 isometrically shows a typical physical layout of the plant functionally illustrated in FIG. 1.
Figure 3:
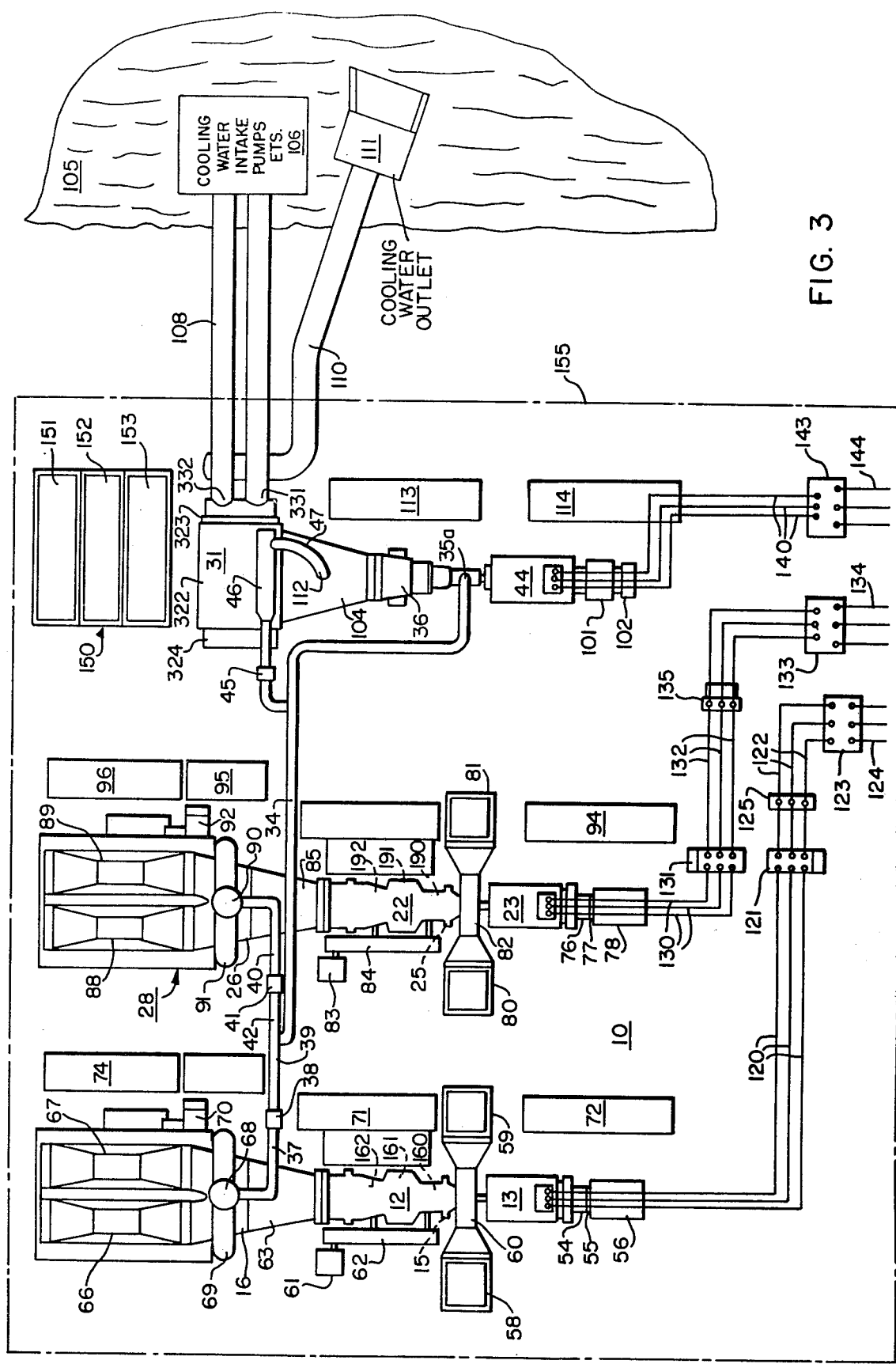
FIG. 3 is a top plan view of the plant layout shown in FIG. 2.

Referring now to FIGS. 2 and 3, there is shown the physical layout and overall structural nature of the apparatus included in the combined cycle electric power generating plant 10. FIG. 2 is a perspective view of the plant 10 and FIG. 3 is a plan view of the plant 10. FIG. 3 is somewhat more detailed and shows some additional structures not shown in FIG. 2. Thus, in the following description, reference will more frequently be had to FIG. 3.

As indicated in FIG. 3, the electric generator 13 is located in line with the gas turbine 12, the rotary shaft of the generator 13 being connected in tandem with the rotary shaft of the gas turbine 12. Also connected in tandem with the generator 13 on the end opposite turbine 12 is an exciter unit 54, a disengaging coupler or clutch mechanism 55 and an electric starting motor 56. Units 54–56 are located inside the enclosure 57 shown in FIG. 2. In the present embodiment, the electric generator 13 is of the three-phase alternating-current hydrogen-cooled type and is capable of generating better than 80 megawatts of electrical power at a voltage of 13.8 kilovolts. The rated speed of generator 13 is 3,600 rpm.

The physical structure associated with the gas turbine 12 includes a pair of vertically extending air intake ducts 58 and 59 which are open at the top and which communicate at their lower ends with a horizontal air intake duct 60. The duct 60, in turn, communicates with the air intake end of the compressor section of the gas turbine 12. In geographical locations having high ambient temperatures, evaporative coolers (not shown) are located in the vertical air intake ducts 58 and 59. The inlet guide vane mechanism 15 is located in the opening at the inlet end of the compressor section of the gas turbine 12. An air-to-air heat exchanger or air cooler 61 is located alongside of the gas turbine 12 and serves to cool some air which is extracted from an intermediate stage of the gas turbine compressor and then returned to the turbine section for purposes of cooling some of the turbine blades. Air cooler 61 is coupled to the gas turbine 12 by way of cooling pipes located in an enclosure 62.

The exhaust end of the gas turbine 12 is connected by way of duct work 63 to the afterburner unit 16 which is, in turn, coupled to the intake or inlet opening of the No. 1 heat recovery steam generator 18. The steam generator 18 includes a stack structure 64 (FIG. 2) having a heavy outer steel casing, such stack structure 64 being tied to and supported by a structural steel framework 65 (FIG. 2). Located at the top of the stack structure 64 are a pair of exhaust sections 66 and 67 which serve to exhaust into the atmosphere the hot gas supplied to the steam generator 18 by the gas turbine 12. The steam generator 18 further includes a deaerator unit 68, a low pressure feed-water storage tank 69 and a vertical high pressure steam drum 70. The overall height of the steam generator 18 is approximately 52 feet or some 5 stories.

Located alongside of the gas turbine 12, the electric generator 13 and the steam generator 18 are a number of auxiliary equipment enclosures 71, 72, 73 and 74. For simplicity of illustration, enclosure 73 is not shown in FIG. 2. Enclosure 71 is a gas turbine mechanical auxiliary equipment enclosure which houses, among other things, the fuel valves, fuel pumps, pressure regulators and the like for the fuel system which supplies the fuel to the gas turbine 12, the lube oil and seal oil equipment for the gas turbine 12 and various control system components such as actuators, control relays, sensors, signal transmitters and the like used in connection with the foregoing mentioned and other mechanisms associated with the gas turbine 12.

Enclosure 72 is a gas turbine and generator auxiliary equipment enclosure which, among other things, houses a motor control center for the gas turbine 12 and generator 13, a bank of storage batteries for providing emergency auxiliary power, a battery charger system for the storage batteries, hydrogen cooling equipment for the generator 13, lube and seal oil equipment for the generator 13 and various control system components such as actuators, control relays, sensors, signal transmitters and the like used in connection with the foregoing mentioned and other mechanisms associated with the gas turbine 12 and generator 13.

Enclosure 73 (FIG. 3) is an afterburner auxiliary equipment enclosure which, among other things, houses the fuel valves for the afterburner 16. Enclosure 74 is a steam generator auxiliary equipment enclosure which, among other things, houses a main boiler feed pump, a standby boiler feed pump, a chemical treatment system including storage tanks and pumps for phosphate, hydrazine and amine, a motor control center and various motors, valves and heater controls associated with the steam generator 18 and various control system components such as actuators, control relays, sensors, signal transmitters and the like used in connection with the foregoing mentioned and other mechanisms associated with the steam generator 18.

The second electric generator 23 is located in line with the second gas turbine 22, the rotary shaft of the generator 23 being connected in tandem with the rotary shaft of the gas turbine 22. Connected in tandem with the generator 23 at the opposite end thereof is an exciter unit 76, a disengaging coupler or clutch mechansim 77 and an electric starting motor 78. Units 76–78 are located in the enclosure 79 shown in FIG. 2. Electric generator 23 is of the three-phase alternating-current hydrogen-cooled type and is capable of generating in excess of 80 megawatts of electrical power at a voltage of 13.8 kilovolts. The rated speed of generator 23 is 3,600 rpm.

The structure associated with the second gas turbine 22 includes a pair of vertical air intake ducts 80 and 81 which are open at the top and which communicates at the bottom with a horizontal air intake duct 82. Duct 82, in turn, communicates with the intake opening of the compressor section of the gas turbine 22. Air cooler 83 and cooling pipes in enclosure 84 serve to cool some air which is extracted from the compressor section of gas turbine 22 and is used to cool some of the blades in the turbine section of the gas turbine 22. The exhaust end of gas turbine 22 is coupled by way of a duct work 85 and the No. 2 afterburner unit 26 to the inlet opening of the No. 2 heat recovery steam generator 28.

The second steam generator 28 is of the same construction as the first steam generator 18 and, as such, includes a stack structure 86 (FIG. 2) having a heavy outer steel casing which is tied to and supported by a structural steel framework 87 (FIG. 2). Located at the top of the stack structure 86 are a pair of exhaust sections 88 and 89 which are open at the top. Steam generator 28 further includes deaerator unit 90, a low pressure feedwater storage tank 91 and a vertical high pressure steam drum 92.

Located alongside of the gas turbine 22, electric generator 23 and steam generator 28 are a gas turbine mechanical auxiliary equipment enclosure 93, a gas turbine and generator auxiliary equipment enclosure 94, an afterburner auxiliary equipment enclosure 95 (not shown in FIG. 2) and a steam generator auxiliary equipment enclosure 96. These auxiliary equipment enclosures 93–96 include the same kinds of equipment as is included in the auxiliary equipment enclosures 71–74, respectively. The equipment, mechanisms and components housed in enclosures 93–96 are used in connection with the operation of gas turbine 22, electric generator 23 afterburner 26 and steam generator 28 in the same manner that the corresponding auxiliary equipment in enclosures 71–74 is used in connection with the operation of gas turbine 12, electric generator 13, afterburner 16 and steam generator 18.

Considering now the steam turbine 36 and its associated electric generator 44, these units are, as indicated in FIG. 3, located in line with one another, the rotary shaft of the generator 44 being connected in tandem with the rotary shaft of the steam turbine 36. Coupled in tandem at the opposite end of the generator 44 is an exciter unit 101 and a turning gear 102. Units 101 and 102 are located in the enclosure 103 shown in FIG. 2. Electric generator 44 is of the three-phase alternating-current hydrogen-cooled type and is capable of generating in excess of 100 megawatts of electrical power at a voltage of 13.8 kilovolts. The rated speed of generator 44 is 3,600 rpm.

Steam turbine 36 receives superheated steam from the two steam generators 18 and 28 by way of steam pipes 34, 37, 39, 40 and 42. The exhaust end of the steam turbine 36 is connected by way of duct work 104 to the steam inlet of the condenser 31. The resulting condensed steam or condensate is collected in a hotwell (not shown) located below the condenser 31, from whence it is pumped back to the steam generators 18 and 28 by way of condensate piping which, for sake of clarity, is not shown in FIGS. 2 and 3.

Cooling water or circulating water for the condenser 31 is obtained from a nearby body of water 105, such as a river or lake or the like, at which is located a water intake station 106. Water intake station 106 includes appropriate circulating water pumps, cooling water pumps, traveling screens, trash racks, strainers, and the like for obtaining the water needed by the condenser 31 as well as the water needed by an auxiliary cooling water system to be described hereinafter. The water intake station 106 pumps circulating water by way of pipes 107 and 108 to the condenser 31 which, as will be seen, is of the divided water box type. Incoming water flowing by way of pipe 108 passes through one set of condenser tubes in the condenser 31 and is returned by way of a discharge pipe 110 and a water outlet station 111 to the body of water 105. Water flowing to the condenser 31 by way of the pipe 107 passes through a second set of condenser tubes in the condenser 31 and is returned to the body of water 105 by way of the discharge pipe 110 and the water outlet station 111. Where the body of water 105 is a river, the outlet station 111 is located on the downstream side of the intake station 106.

As is seen in FIG. 3, the desuperheater 46 in the steam bypass path is located above the condenser 31, the discharge end of the desuperheater 46 being connected by way of pipe 47 to a bypass inlet 112 in the duct work 104.

Located alongside of the stream turbine 36 is a steam turbine mechanical auxiliary equipment enclosure 113 which, among other things, houses a hydraulic system for the steam turbine valves, a lube oil system for the steam turbine 36 including a lube oil cooler and controller, a gland steam condenser, air ejector apparatus for the condenser 31 and various control system components such as actuators, control relays, sensors, signal transmitters and the like used in connection with the steam turbine 36 and the condenser 31. Located alongside of the electric generator 44 is a steam turbine and generator auxiliary equipment enclosure 114 which, among other things, houses a motor control center for the steam turbine 36 and generator 44, a bank of storage batteries for providing emergency auxiliary power, a battery charging system for the storage batteries, hydrogen cooling equipment for the generator 44, seal oil equipment for the steam turbine 36 and generator 44 and various control system components such as actuators, control relays, sensors, signal transmitters and the like used in connection with the foregoing mentioned and other mechanisms associated with the steam turbine 36, generator 44 and condenser 31.

Three-phase alternating-current electrical power is taken from the armature windings of the three-phase alternating-current generator 13 by means of power conductors 120 which run to oil-type circuit breakers 121. The output sides of circuit breakers 121 are connected by power conductors 122 to the primary windings of a three-phase main power transformer 123. The secondary windings of the main power transformer 123 are connected by means of power conductors 124 to an adjacent high-voltage transmission substation (not shown) of the electric utility system which receives the electricity generated by the electric power generating plant 10. An auxiliary transformer 125 is connected to the power conductors 122 and is used to tap off some of the electrical power produced by the generator 13 for use in operating the various electrical equipment and apparatus included in the plant 10.

Three-phase alternating-current power is taken from the armature windings of the second three-phase alternating-current generator 23 by means of power conductors 130 which run to oil-type circuit breakers 131. The output sides of circuit breakers 131 are connected by power conductors 132 to the primary windings of a second three-phase main power transformer 133. The secondary windings of the main power transformer 133 are connected by means of power conductors 134 to the adjacent high-voltage transmission substation (not shown) of the electric utility system which receives the power generated by the combined cycle plant 10. An auxiliary transformer 135 is connected to the power conductors 132 and is used to tap off some of the electrical power produced by the generator 23 for use in energizing the various electrical equipment and apparatus included in the plant 10.

Three-phase alternating-current power is taken from the armature windings of the third three-phase alternating-current generator 44 by means of power conductors 140 which run to the primary windings of a third three-phase main power transformer 143. The secondary windings of the main power transformer 143 are connected by means of power conductors 144 to the adjacent high-voltage transmission substation of the electric utility system which receives the power from the plant 10.

The adjacent high-voltage transmission substation (not shown) which is connected to the secondary windings of the three main power transformers 123, 133 and 143 via conductors 124, 134 and 144 is, in turn, connected to the electric power transmission system which is used to carry the electrical power generated by the plant 10 to the various industrial, commercial and residential customers of the electric utility system. By way of example only, the magnitude of the voltage generated by each of the generators 13, 23, and 44 may have a value of, for example, 13.8 kilovolts and the magnitude of the voltage appearing across the secondary windings of each of the main power transformers 123, 133 and 143 may have a value of, for example, 230 kilovolts.

The combined cycle plant 10 further includes a main control center (sometimes called plant control center) building 150 which is formed by joining together three prefabricated transportable room-size building modules 151, 152 and 153. The control center building 150 houses the main operator control board (sometimes called "BTG board") for the plant 10, a pair of digital computers, numerous analog control and monitor subsystems and the protective relays and voltage regulators for the electric generators 13, 23, and 44. The building modules 151, 152 and 153 are prefabricated elsewhere and the control system equipment and other equipment contained therein is installed in the building modules 151, 152 and 153 and systems tested with a plant simulator (not shown) at an appropriate factory or manufacturing location before the building modules 151, 152 and 153 are transported to the site of the power generating plant 10. This pre-installing and pre-testing of the control system equipment considerably minimizes both the overall and the on-site setup time and expense for the control system equipment contained in the control center building 150. The various electrical cables and conductors which run between the main control center building 150 and the other portions of the plant 10 are located in underground conduits (not shown) which lie just below the ground surface.

In the perspective view of FIG. 2, the various steam pipes, condensate pipes, electrical power conductors and the like which run between the different plant units and structures have been omitted for sake of simplicity.

The power generating plant 10 is relatively compact and efficient in terms of land usage. In particular, the plant 10 is located on a plant site 155 which occupies approximately 1.3 acres of land. For a nominal power generating capacity of 260 megawatts, this represents a land usage factor of approximately 4.6 kilowatts per square foot. Not included within the boundaries of the plant site 155 are one or more fuel oil storage tanks (not shown), a makeup water storage tank (not shown) and the cooling water intake and outlet stations 106 and 111 previously considered. Nevertheless, the 4.6 kilowatt per square foot figure is useful for comparison purposes and, as such, the combined cycle plant 10 provides a substantially better land usage factor than do the comparable portions of other types of electric power generating plants.

A further and more significant feature of the combined cycle plant 10 is that the plant erection or construction time and cost are considerably minimized compared to other types of electric power generating plants. This results from the prefabricated modular construction and ground level installation of all major operating units and the modular construction and factory testing of the control system. The initial preparation of the plant site 155 includes the pouring of appropriate concrete slabs, footings and foundation structures for the various operating units. The various units of plant equipment are prefabricated and pre-equipped at one or more factory locations. They are then transported to the plant site 155, set down on the foundation structures and interconnected in the appropriate manner. In the case of some of the larger units, such as the steam generators 18 and 28 and the control center building 150, the units are constructed in the form of large but transportable modules which are transported to the plant site 155 and then bolted or welded together to form the complete unit. The prefabrication of the modules is such that the field erection work is held to a minimum. As a result of this prefabricated modular approach, the combined cycle plant 10 can be erected and put into operation in one-third or less of the time required for more conventional type electric power generating plants having a comparable power generating capacity. Accordingly, the customer order lead time needed to provide generation capacity on line to meet energy demands is materially reduced. Also, the plant cost per kilowatt of power generation capacity is considerably reduced.

B. Gas Turbine Mechanical Structure

Figure 4A:
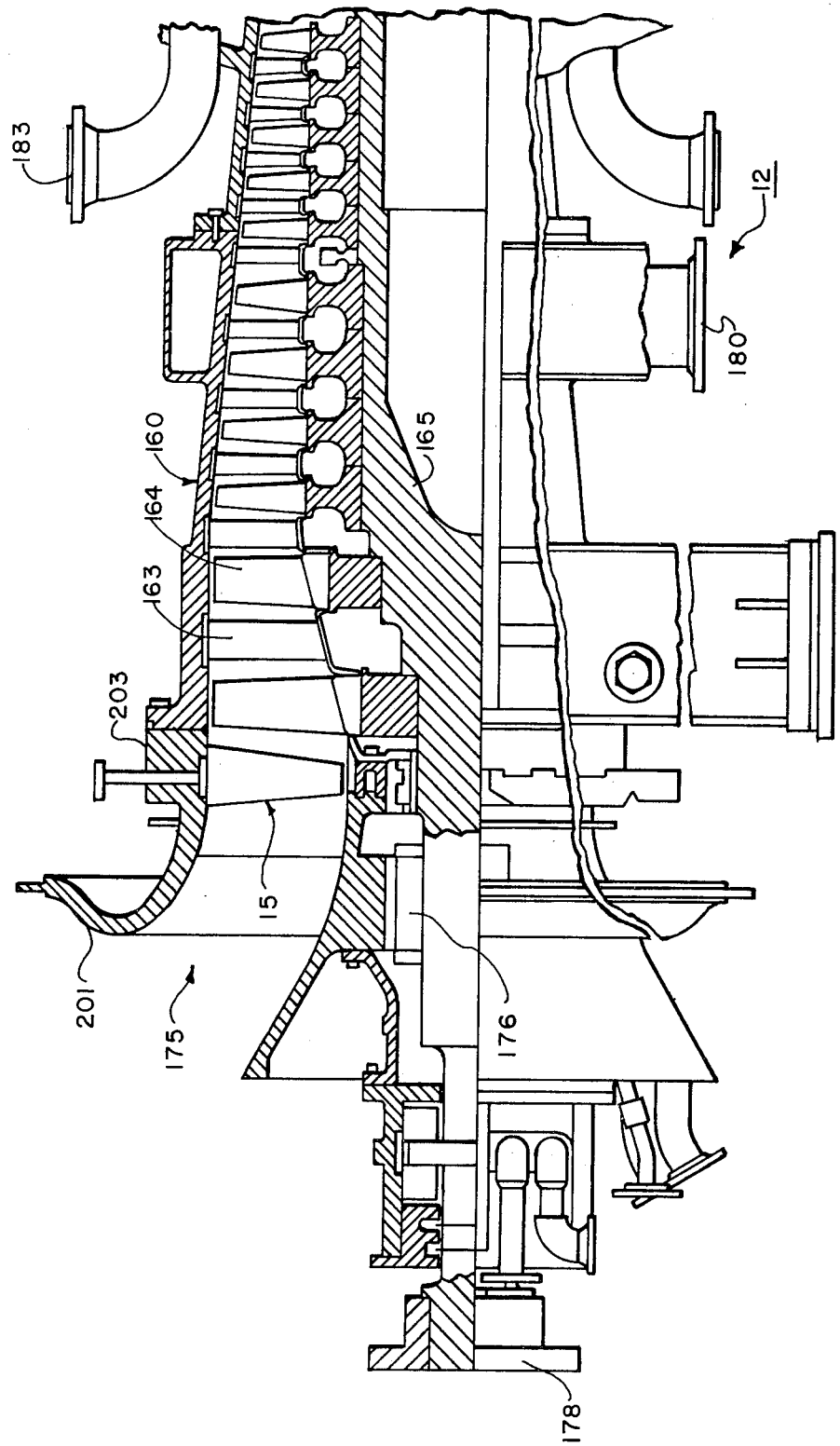
FIGS. 4A–4B, which are partially sectioned, illustrate a side view of a gas turbine included within the plant shown in FIG. 2.
Figure 4B:
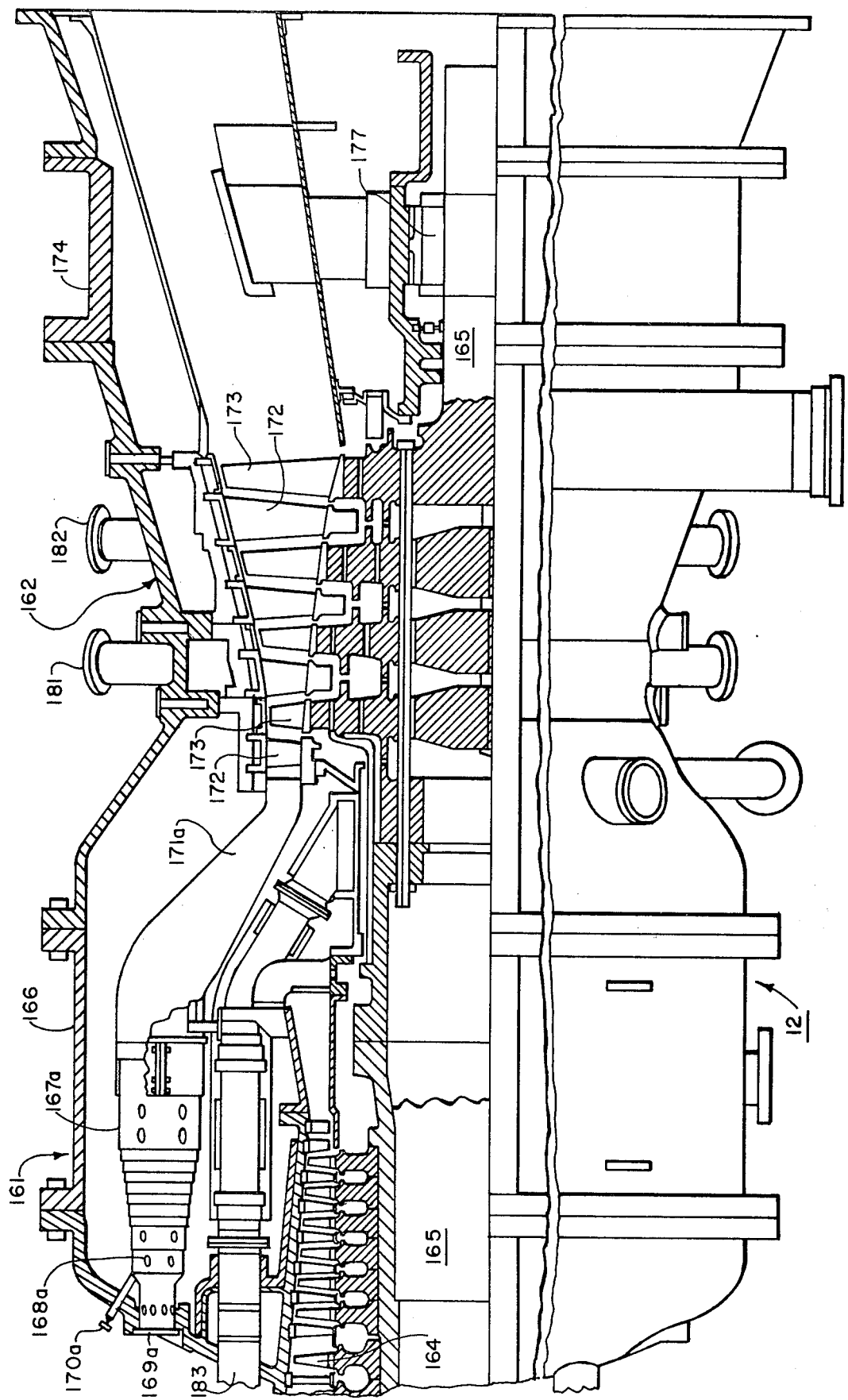

Referring now to FIGS. 4A and 4B, there is shown a longitudinal, partially cross-sectional, elevational view of the No. 1 gas turbine 12. FIG. 4A shows the left-hand half of the view and FIG. 4B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pennsylvania. It is of the simple open cycle type and employs a single-shaft two-bearing construction in which no bearings are located in a high pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a–167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170a serving to provide for the initial ignition of the fuel. This fuel is burned in the combustor 167a and the resulting high-temperature, high-pressure gas is supplied by way of a combustor outlet duct 171a to the inlet of the turbine section 162.

The turbine section 162 is a four stage turbine having interspersed sets of stationary blades 172 and rotary blades 173, the latter being located on the rotor structure 165. The high-temperature high-pressure gas from all of the combustors 167a–167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct 63 for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency. This guide vane mechanism 15 is described in greater detail in connection with FIGS. 5 and 6.

The two bearings which support the single rotor structure 165 of the gas turbine 12 are indicated at 176 and 177. As seen, these bearings 176 and 177 are located outside of any high-pressure high-temperature zone. The electric generator 13 is coupled to the cold or compressor end 178 of the rotor structure 165 to avoid potential misalignment problems. Some air is removed from the compressor 160 by way of outlet 180, externally cooled and filtered by the air cooler 61 (FIG. 3) and returned to the turbine section 162 to cool the first two sets of stationary blades 172 and the first set of rotary blades 173. The cooling air for the stationary blades 172 enter through inlets 181 and 182, while the cooling air for the first set of rotary blades 173 enters via inlet 183.

As mentioned, the No. 2 gas turbine 22 is of the same construction as the No. 1 gas turbine 12. As such, the No. 2 gas turbine 22 includes a compressor secton 190, a combustion section 191 and a turbine section 192, the locations of which are indicated in FIG. 3. These sections 190, 191 and 192 are identical in construction to the corresponding sections 160, 161 and 162 of the first gas turbine 12, the latter being shown in detail in FIGS. 4A and 4B.

INLET GUIDE VANE MECHANICAL STRUCTURE

Figure 5:
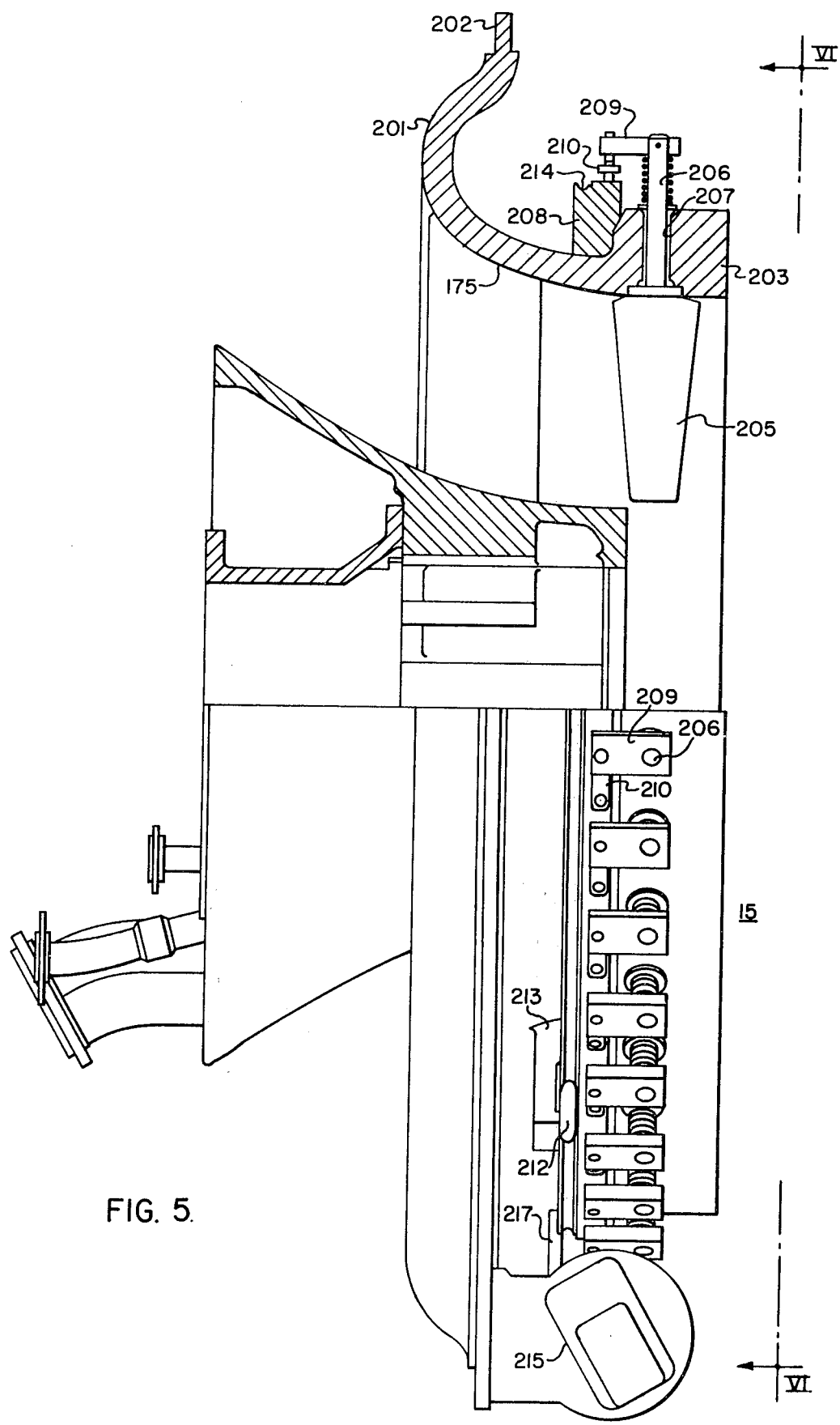
FIGS. 5 and 6 illustrate the details of the variable inlet guide vane mechanism associated with the gas turbine of FIGS. 4A–4B.
Figure 6:
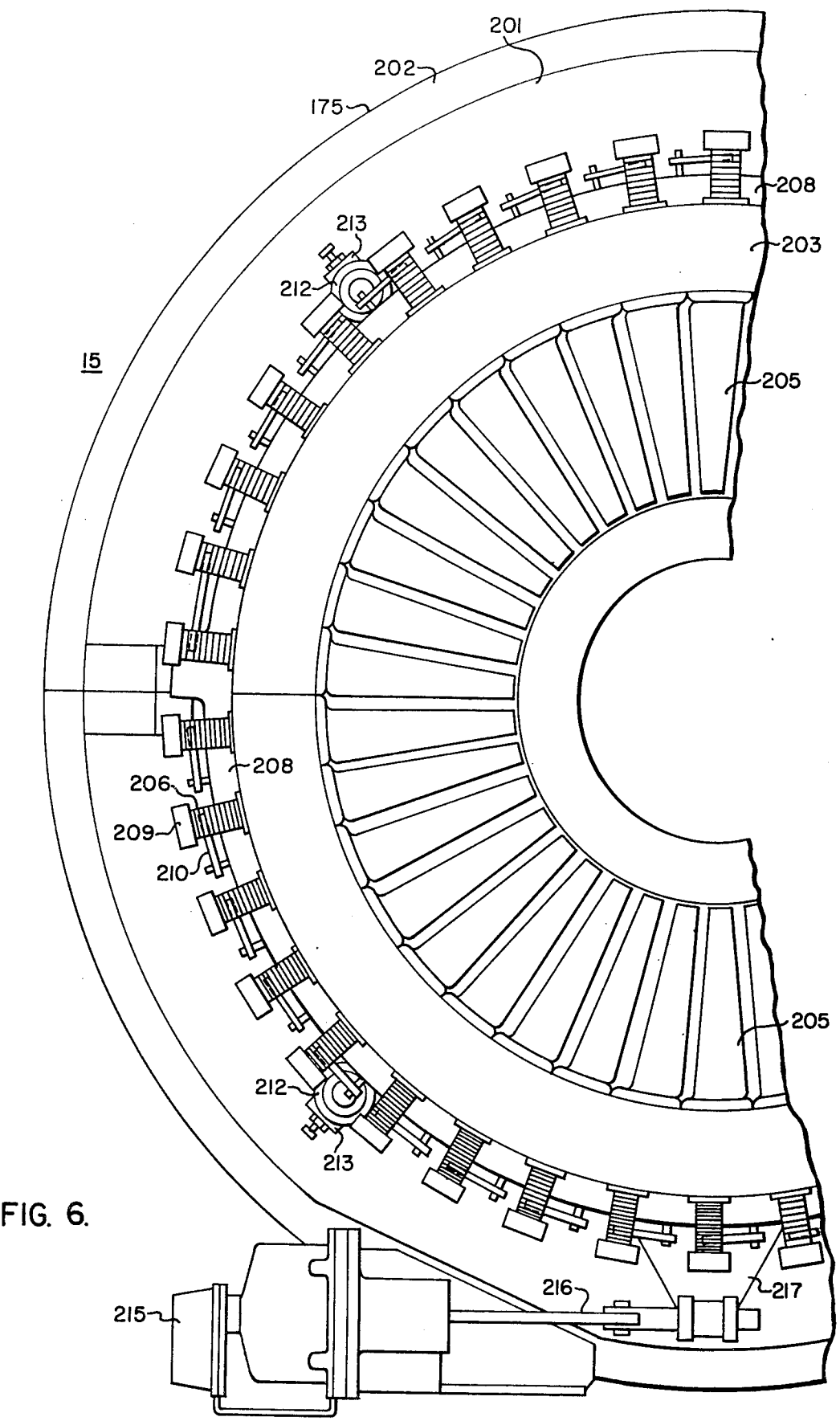
Figure 7:
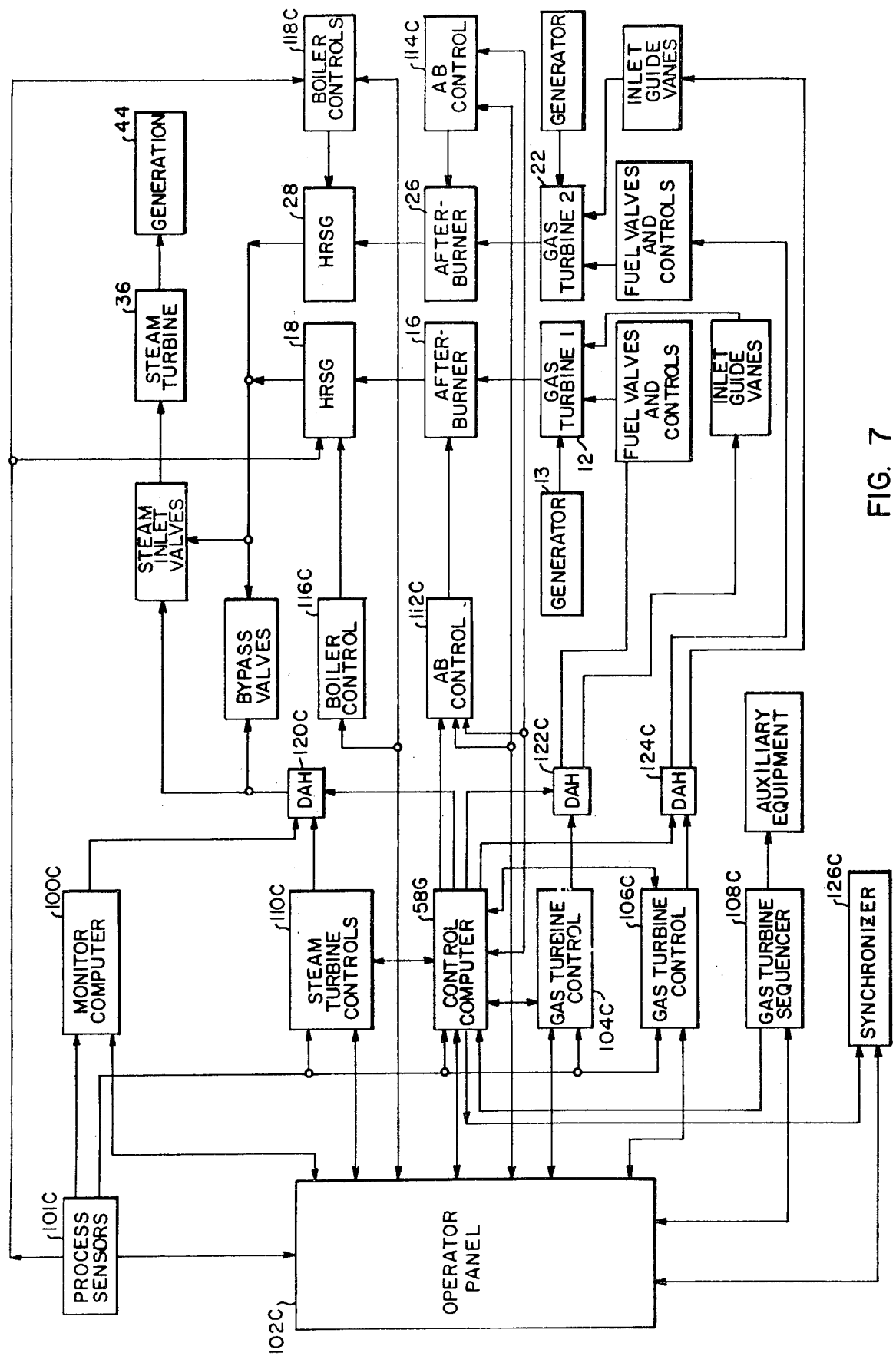
FIG. 7 shows a schematic view of the overall control system arranged to operate the plant shown in FIG. 2.

Referring now to FIGS. 5 and 6, there is shown in greater detail the manner of construction of the variable inlet guide vane mechanism 15 located at the air intake end of the gas 12. FIG. 5 is a partially broken away side elevational view of the guide vane mechanism 15 taken in the same direction as the gas turbine view shown in FIGS. 4A and 4B. FIG. 6 is a partial rear elevational view of the guide vane mechanism 15, taken at right angles to the view of the FIG. 5 and from a point located downstream of the mechanism 15 and looking in a direction opposite to the direction of air flow.

As indicated in FIGS. 5 and 6, the gas turbine air intake structure 175 is of a circular ring-like shape having a curved lip portion 201 on the air inlet side thereof. A circular flange 202 is provided at the outer extremity of the curved lip portion 201, such flange 202 being used to fasten the air intake structure 175 to the outlet opening in the horizontal air intake duct 60 (FIG. 3). The intake structure 175 further includes a circular body portion 203 on the outlet side thereof which is adapted to be fastened to the main casing of the gas turbine 12.

The inlet guide vane mechanism 15 includes a set of 38 radially extending blades or vanes 205 which are evenly spaced around the inner periphery of the body portion 203 and which extend inwardly therefrom toward the longitudinal center axis of the gas turbine 12. Each of these vanes 205 is rotatably mounted in and supported by the body portion 203 by means of its own individual radially extending shaft 206 which is attached to the outer end of the vane and is journaled in a bearing passageway 207 formed in the body portion 203. Each of the 38 vane shafts 206 is coupled to a common movable ring 208 by means of links 209 and 210. One end of link 209 fits over the top of the shaft 206 and is pinned to the shaft 206 so that movement of the other end of the link 209 will cause rotation of the shaft 206 and, hence, rotation of the vane 205. This other end of link 209 is pivotally connected to one end of the second link 210, the other end of the second link 210 being pivotally connected to the movable ring 208.

The movable ring 208 encircles the intake structure 175 just ahead of the body portion 203 and is supported in place by rollers 212 having support brackets 213 which are attached to the outer side of the intake structure 175. Rollers 212 engage a groove 214 formed in the outer periphery of the movable 208. The construction and linkage is such that a rotational movement of the movable ring 208 around the longitudinal center axis of the gas turbine 12 will cause a simultaneous and in-step rotation of all 38 of the vanes 205 about their radial axes.

Rotational movement of the movable ring 208 is produced by an actuator mechanism 215 having a piston 216 (FIG. 6) which is coupled to a bracket 217 which is attached to and extends outwardly from the movable ring 208 at the lower extremity thereof.

The construction of the inlet guide vane mechanism 15 is such that the vanes 205 may be rotated through an angle of 40° relative to their radially extending axes. The maximum open position of the vanes 205, wherein the vanes 205 offer the least resistance to the flow of air through the intake structure 175, is denoted as the zero degree position. Conversely, the maximum closed position of the vanes 205, wherein the vanes 205 present the greatest resistance to the flow of air through the intake structure 175, is denoted as the 40° position. The dimensions and shape of the vanes 205, as well as the limit on the amount of rotation of the vanes 205, is such that the air flow passage through the intake structure 175 can never be completely closed. In particular, with the vanes 205 in the maximum closed position, there will still be enough air flow through the intake structure 175 to keep the gas turbine 12 operating. As previously indicated, the purpose of the variable inlet guide vane mechanism 15 is to adjust compressor air flow during the starting cycle and to increase part load efficiency of the gas turbine 12.

The inlet guide vane mechanism 25 associated with the second gas turbine 22 is of the same construction as shown in FIGS. 5 and 6 for the inlet guide vane mechanism 15 associated with the first gas turbine 12.

C. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

As shown in FIG. 3, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automatically schedules fuels during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 102C, 122C and 124C interface the digital and analog controls.

Under plant coordinated control, the computer 58G generally directs the plant operation through startup, synchronization and loading to produce the plant power demand. The extend of coordinated plant control is dependent on the existing plant configuration, i.e., according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e., they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

Figure 8:
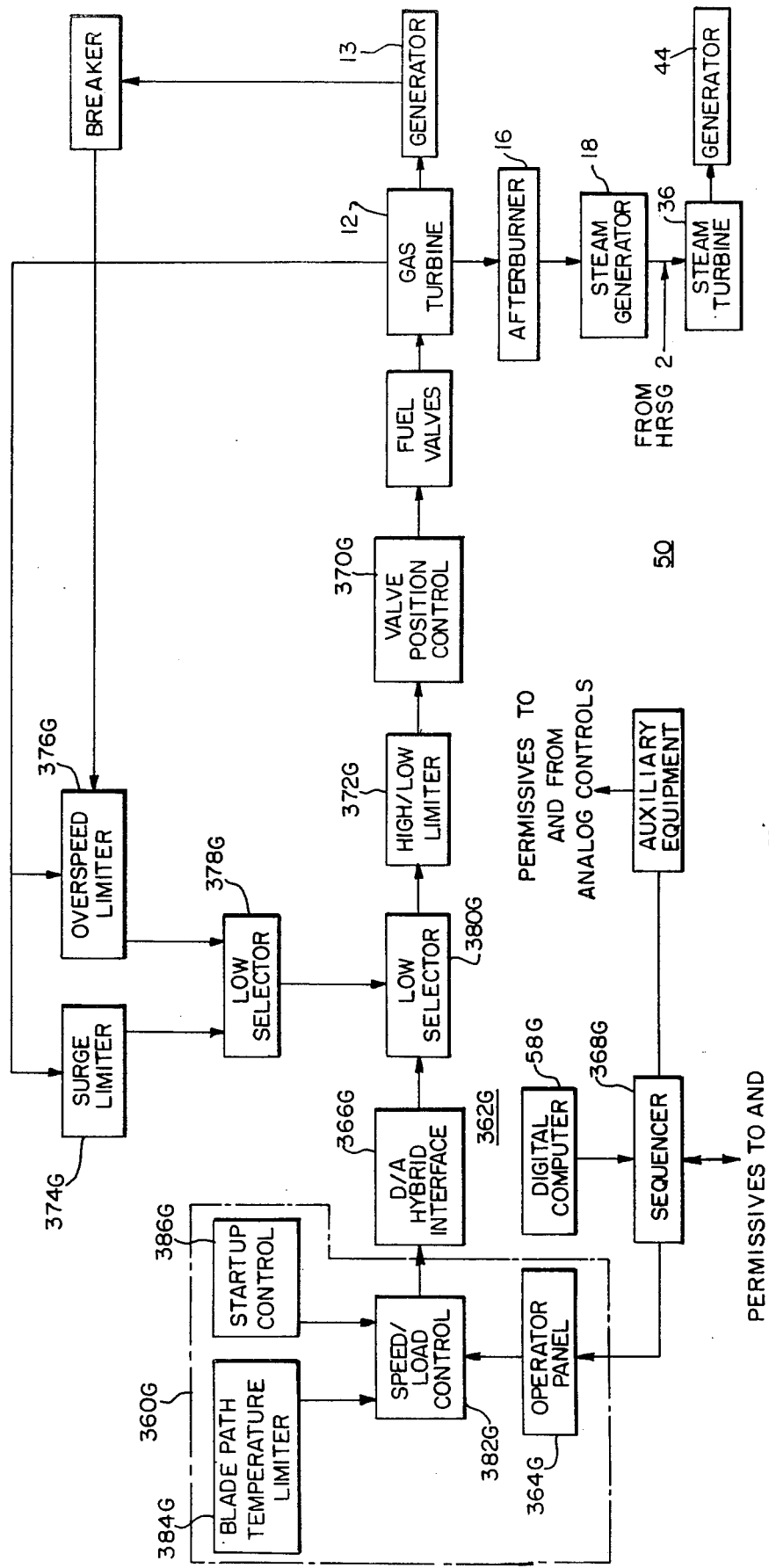
FIG. 8 schematically illustrates the plant control system of FIG. 7.
Figure 9:
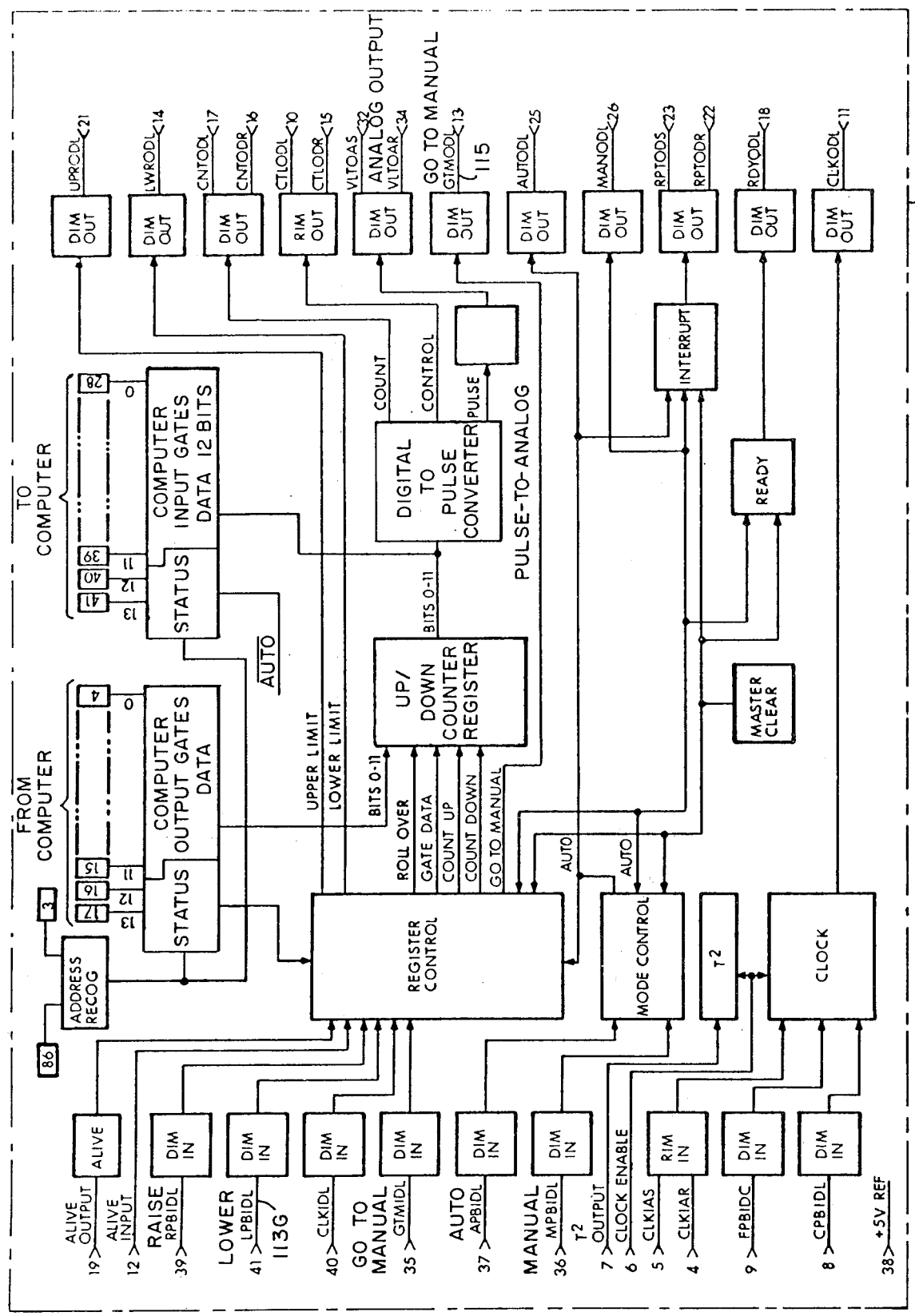
FIG. 9 schematically illustrates the operation of an interface, or NGC card, utilized in the present invention.

As shown in FIG. 8, a backup control indicated by box 360G is preferably included with a programmed digital computer automatic control 362G in the plant control system 50 to provide for turbine and plant operation in the event the operator selects the manual or operator analog mode of operation or in the event the computer 58G rejects to backup control. Transfer to backup control can be transacted any time after ignition during startup or load operation.

The manual/automatic status of the plant control system 50 is fixed by operator selection at an operator panel 364G or by a computer rejection to manual. A digital/analog hybrid interface 366G includes manual/automatic logic circuitry to detect when the gas turbine 12 is to be on backup control and to make switching operations which implement the applicable control mode.

In automatic control, the digital computer 58G generates a fuel reference when operating in the coordinated and the operator automatic control levels during speed and load control to function as an automatic speed/load controller, and it initiates turbine startup by a sequencing system 368G under coordinated control. Generally, the sequencer 368G sequences the gas turbine 12 through the startup process by starting and stopping auxiliary equipment when sequencing permissives are generated, and it trips the turbine if certain conditions develop. Farther, the sequencer 368G generates logicals for the turbine controls, i.e. a master relay on signal, a fuel on signal, a breaker status signal, a fuel select and transfer signal, and a flame on signal.

The digital/analog hybrid interface 366G generates an output fuel demand signal as a valve position reference for a valve position control 370G comprising electropneumatic circuitry which operates a throttle valve included in the fuel supply system for the gas turbine 12. In automatic control, the computer generated fuel demand is based on an automatic startup fuel scheduling program subject to limit action by a computer blade path temperature limit control during startup and further it is based on a computer load control subject to the computer blade path temperature limit control during load operation. A high/low limiter 372G prevents the fuel demand signal from rising to levels which would cause excessive fuel flow and from falling to levels which could cause outfire.

A surge limit control 374G and an overspeed limit control 376G function in all modes of operation directly through the fuel valve positioning control 370G to limit the fuel demand reference for the purpose of avoiding surge operating conditions and turbine overspeed. For more detail on the surge protection system and the overspeed protection system, reference is made to copending and coassigned patent applications W.E. 44,836 entitled "A Combined Cycle Electric Power Plant And A Gas Turbine Having An Improved overspeed Protections System" and filed by J. Smith and T. Reed concurrently herewith and ISD 74-3 entitled "A Combined Cycle Electric Power Plant And A Gas Turbine Having An Improved Surge Protection System" filed by J. Smith concurrently herewith.

A low select function 378G transmits the lowest of the surge and overspeed protection limit signals as a limit on the fuel demand from the hybrid 366G. Thus, another low select function 380G imposes a limit on the hybrid fuel demand by transmitting the lowest of the low limit signal from the low select function 378G and the hybrid fuel demand to the throttle valve position control 54. Through low selector operation, surge and overspeed limit control action is imposed bumplessly on the fuel control channel.

In the operator analog mode, a speed/load control 382G functions in response to pushbutton increase or decrease signals from the operator panel 364G to generate the fuel demand signal at the output of the hybrid interface 366G. The speed/load control 382G thus functions in the backup mode as a feedforward fuel reference generator without integrator or other controller action like that often employed in feedback type speed/load controls for power plant gas turbines. The feedforward fuel demand from the backup speed/load control 382G is applied substantially directly to the valve position control 370G to provide direct turbine responses proportional to fuel demand changes made by the operator. Accordingly, the plant operator is provided with a good feel for the plant operation. Further, protection system actions are imposed at points in the control circuitry between the operator and the turbine to prevent unsafe operator actions. Preferably, the limit controls are adjusted to produce the limit actions needed for safe turbine operation while permitting the speed/load control 382G to be the controlling element under normal operating conditions in the manual or operator analog mode.

A blade path temperature limit control 384G functions only in the manual or operator analog mode to limit bumplessly the output signal from the speed/load control 382G as required to prevent excessive blade path temperature and in turn excessive turbine inlet gas temperature. For more detail on the prferred blade path temperature protection system, referance is made to a copending and coassigned patent application entitled "A Combined Cycle Electric Power Plant And A Gas Turbine Having Improved Exhaust Temperature Limit Control" and filed by J. Smith and T. Reed concurrently herewith.

If the turbine is to be started in the manual or operator analog mode or if the automatic control rejects to manual during the startup mode, the gas turbine startup is smoothly completed by the operation of a startup control 386G which generates a feedforward speed reference function. More disclosure on that subject is set forth in another copending and coassigned patent application W.E. 44,523 entitled "A Combined Cycle Electric Power Plant And A Gas Turbine Having An Improved Startup Control Especially Useful In A Backup Control System" filed by J. Smith and T. Reed concurrently herewith.

As a result of the functioning of the feedforward speed/load control 382G in the control system 50, the gas turbine 12 can be safely, reliably and flexibly started and loaded by the operator on operator selection of the manual or operator analog mode or on computer rejection to the backup mode. Direct coupling of the speed/load control 382G to the valve position control 370G with substantially only signal transmittal functions therebetween helps to make this possible. Thus, no controller delays are introduced into the forward control channel functioning by the switching and converting functions provided by the hybrid interface 366G nor by the switching functions provided by the selector 380G and the high/low limiter 372G.

The plant apparatus elements all can function more continuously to have better availability for power generation because the gas turbine can function as a more available heat source and power generator for the plant through the functioning of the control system 50 with the backup control 360G.

D. Inlet Guide Vane Control Apparatus

Figure 10:
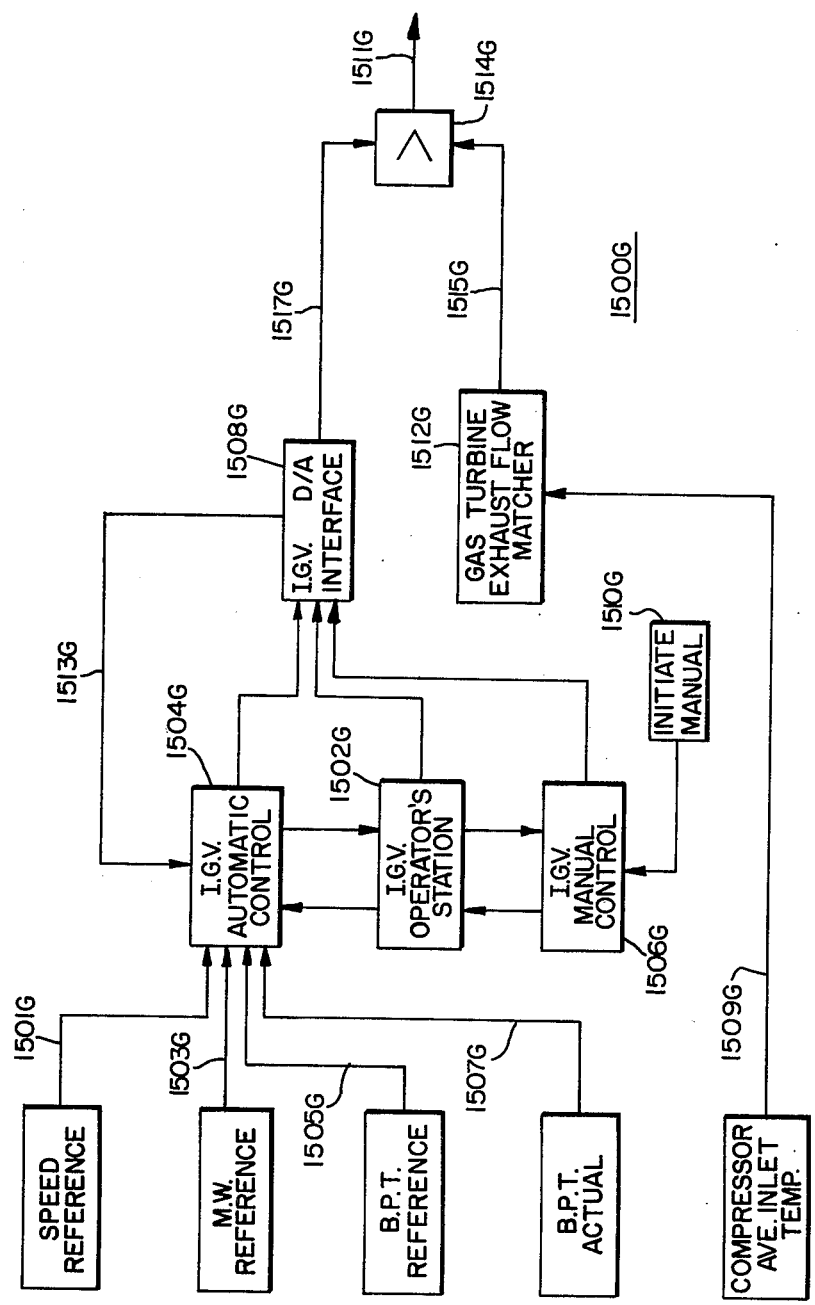
FIG. 10 schematically illustrates the functional relationships of inlet guide vane control apparatus arranged in accordance with the principles of the present invention.
Figure 13:
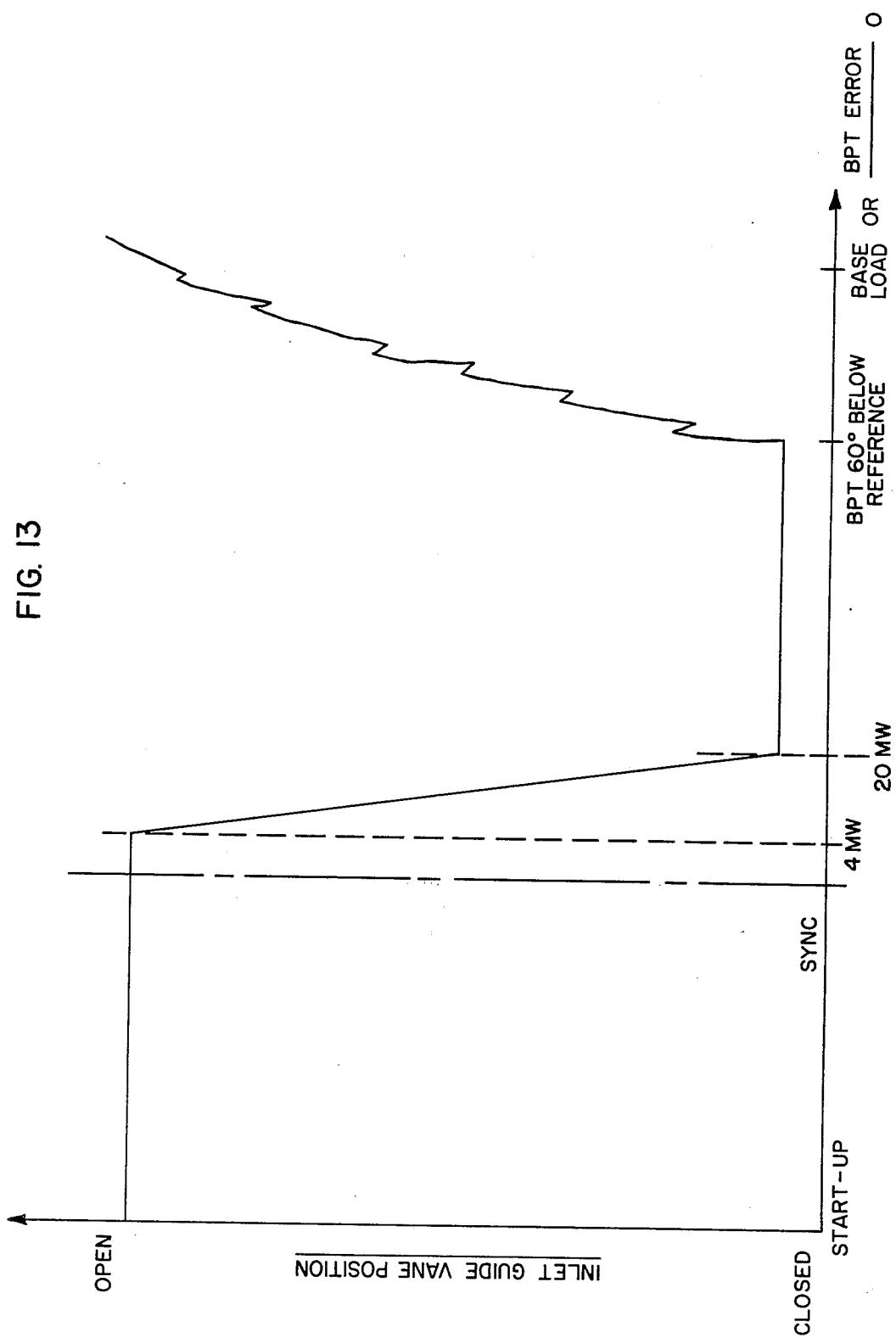
FIG. 13 graphically illustrates the position of the inlet guide vanes from startup to base load under automatic control of the apparatus shown in FIG. 10.

The variable inlet guide vane mechanism 15 previously described in connection with the gas turbine 12 is controlled by an inlet guide vane control apparatus 1500G which is illustrated in FIG. 10. The inlet guide vane control apparatus 1500G includes an inlet guide vane operator's station 1502G, an automatic control block 1504G and a manual control block 1506G. As shall be hereinafter discussed in greater detail, the inlet guide vane control apparatus 1500G is operable either in an automatic or a manual mode. Further, the inlet guide vane control apparatus 1500G, as is graphically illustrated in FIG. 13, is operable from startup to achievement of base load for its associated gas turbine 12.

The operator's station 1502G is cross-coupled to both the automatic and manual control blocks 1504G and 1506G, respectively. In addition, the operator's station 1502G, the automatic control block 1504G and the manual control block 1506G are connected to the inlet guide vane manual/automatic interface block 1508G which, in turn, outputs on line 1517G a control signal for determining the position of the inlet guide vanes of gas turbine 12. The output control signal from interface block 1508G is determined by a selected or forced mode of operation of the inlet guide vane control apparatus 1500G.

A speed reference signal, a megawatt reference signal, a blade path temperature reference signal and the actual blade path temperature signal are fed via lines 1501G, 1503G, 1505G and 1507G, respectively, to the automatic control block 1504G. In response thereto, the automatic control block 1504G develops a control signal which is either speed, load or temperature dependent, depending generally upon the degree of loading achieved at the time a particular control signal is developed. The control signal developed by the automatic control block 1504G is subsequently fed to the inlet guide vane actuator mechanism 215 via the inlet guide vane manual/automatic interface block 1508G, line 1517G, high select block 1514G and line 1511G. The manual control block 1506G also develops a control signal for manually positioning the inlet guide vanes, which signal is also forwarded in a similar manner to output line 1511G and the actuator mechanism 215.

Under certain conditions, the inlet guide vane control apparatus 1500G will be placed in the manual mode of operation either by operator action or by reason of manual mode initiate signal developed in block 1510G. When this occurs, the control signal generated in manual control block 1506G is the signal forwarded to actuator mechanism 215. On the other hand, if the inlet guide vane control apparatus 1500G is operating in the automatic mode, then the control signal developed by the automatic control block 1504G is the one that is ultimately utilized to position the inlet guide vanes via the action of the actuator mechanism 215. The control signals developed in the automatic and manual blocks 1504G and 1506G, respectively, are forwarded to line 1511G through the inlet guide vane manual/automatic interface block 1508G. Line 1513G provides a feedback path from the inlet guide vane manual/automatic interface block 1508G so that the automatic control block 1504G is constantly updated and advised as to the value of the analog control signal being forwarded to the inlet guide vane actuator mechanism 215. Thus, for tracking purposes, even though the inlet guide vane control apparatus 1500G may be in the manual mode of operation, the automatic control block 1504G is constantly appraised of the magnitude of the manual control signal and is thereby able and ready to assume operational command.

Gas turbine exhaust flow matching is provided by block 1512G in response to a compressor average inlet temperature signal received via line 1509G. This block is employed in order to prevent increased mass flow from the gas turbine exhaust to its associated steam generator 18, which increased mass flow would result in the generation of low temperature steam whenever less than an optimum ambient temperature level exists. To prevent this from occurring, the gas turbine exhaust flow matcher 1512G develops a guide vane control signal which if forwarded via line 1515G to high select block 1514. Normally, the inlet guide vane control signal received by the high select block 1514G from the manual/automatic interface block 1508G will be higher than the control signal received from the gas turbine exhaust flow matcher 1512G. Consequently, high select block 1514G will pass, via line 1511G to actuator mechanism 215, the signal received from the manual/automatic interface block 1508G. However, whenever the ambient temperature or the compressor inlet temperature level falls below the predetermined optimal point and the turbine closes in on synchronous speed, the inlet guide vane control signal developed by the gas turbine exhuast flow matcher 1512G will be the higher of the two signals received by the high select block 1514G. In such a case, the high select block 1514G will pass the higher signal developed by the gas turbine exhaust flow matcher 1512G to actuator mechanism 215. When this occurs, the inlet guide vanes are kept open even though the automatic or manual mode of operation would otherwise call for partial or full closure. In this manner, at lower ambient temperature levels, and as the gas turbine approaches synchronous speed or is being loaded, the exhaust flow from the gas turbine 12 is matched to the requirements and operating criteria of the steam generator 28 with which it is associated.

The inlet guide vane control apparatus 1500G illustrated in FIG. 10 controls the operation of the variable inlet guide vane mechanism 15 located at the air intake end of the gas turbine 12. Identical control apparatus is provided for the gas turbine 22 and its associated variable inlet guide vane mechanism 25. Consequently, no further discussion of the inlet guide vane control apparatus associated with turbine 22 is necessary. It should also be noted that while the following description of the preferred embodiment of the inlet guide vane control apparatus 1500G illustrates the use of a combined digital and analog system, modifications and alterations thereof may be embodied or implemented in other form.

E. Inlet Guide Vane Control Apparatus - Automatic Mode Functional Description

As previously noted, the inlet guide vane control apparatus 1500G is capable of operation in an automatic mode. The following discussion presents the details of the automatic mode of operation. It should be noted, that while the following description of the preferred embodiment of the automatic mode of operation is implemented in a digital manner, that alternative implementation or modification thereof is within the reach of one having ordinary skill in the art.

Figure 11:
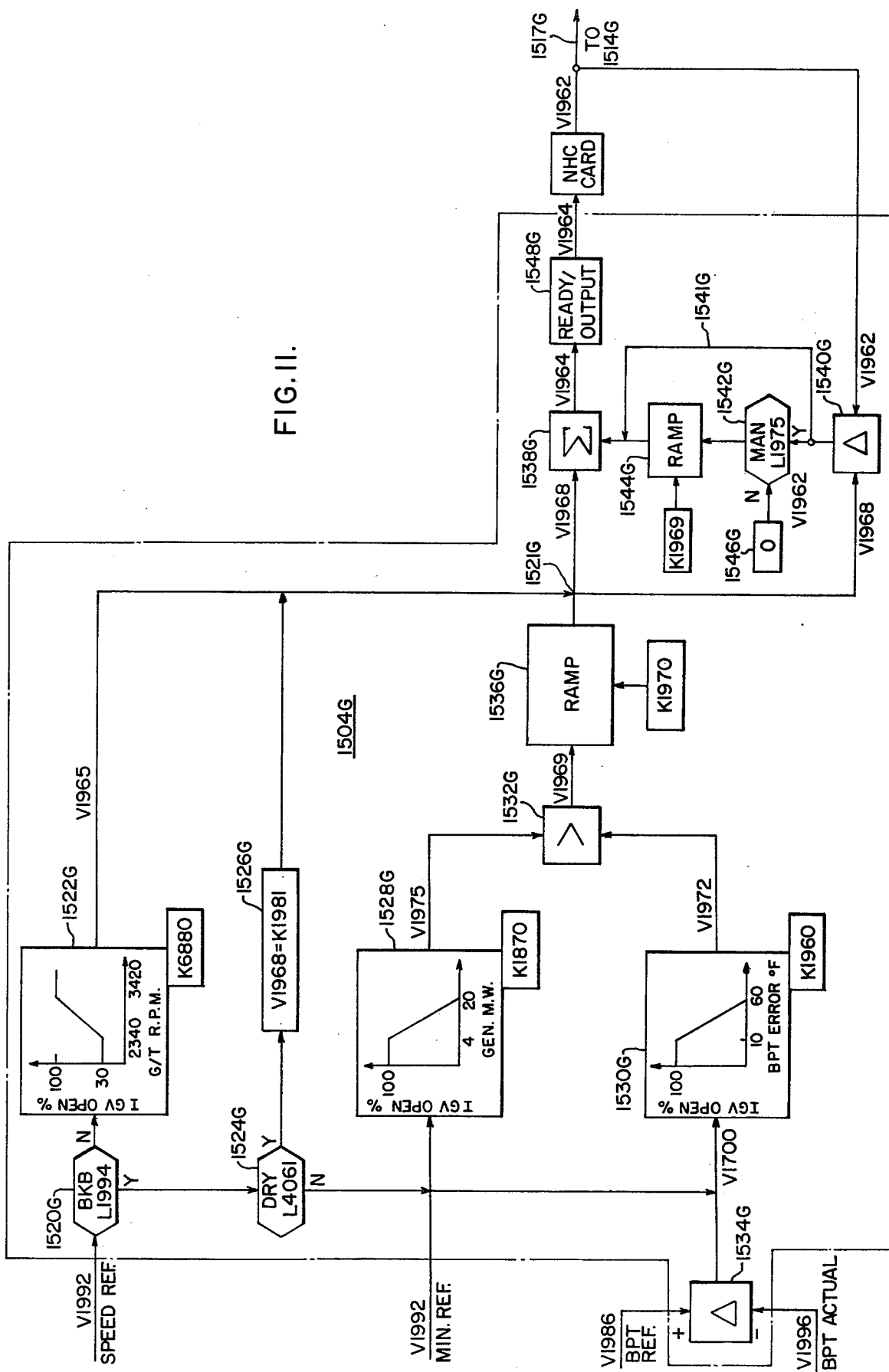
FIG. 11 represent a functional illustration of the automatic mode operational elements of the control apparatus shown in FIG. 10.

The functional and operational interaction of the various elements of the inlet guide vane automatic control block 1504G are illustrated in FIG. 11. From the point of startup, automatic control block 1504G receives a speed reference signal denominated as the process real variable V1992. If the breaker flip-flop L1994 has not been set, then decision block 1520G is exited NO, to speed characterizing block 1522G. As can be seen from the curve drawn within that block, the inlet guide vanes are held at 30 percent fully open until a speed of 2340 rpm is reached by the gas turbine. When that speed is reached, the guide vanes are ramped further open until a speed of 3420 rpm, or 92 percent of sync speed, is reached at which time the guide vanes will be 100 percent open. The guide vanes are then held at the 100 percent open position until such time as different action is dictated by other elements within the automatic control block 1504G as will be hereinafter explained. The curve shown in the speed characterizing block 1522G is determined by the array K6880. The characterized signal is denominated as a process real variable V1965. If the gas turbine is operating within the initial startup period to 92 percent synchronous speed, then the process real variable V1965 is equal to V1968 at point 1521G.

If decision block 1520G indicates that the breaker has been closed, that synchronization has been reached, then decision block 1524G is interrogated to determine the status of the process logical variable L4061, the dry boiler contact input. If the boiler is, in fact, found to be dry, decision, block 1524G is exited via the YES line and V1968 is set equal to K1981 in block 1526G. K1981 is a constant which reflects a fully open inlet guide vane position for dry boiler operation. The output from block 1526G is forwarded to point 1521G.

If the interrogation of block 1524G results in a determination that the boiler is not being operated in a dry condition, then a megawatt reference signal denominated as V1992 is inputted to the characterizing block 1528G. As shown in FIG. 11, block 1528G includes a curve generated by array K1870, the curve determining the inlet guide vane position for the degree of generator loading. As illustrated, the guide vanes are kept at a 100 percent open position until a four megawatt loading point is reached. From there to 20 megawatts, the inlet guide vanes are ramped closed until they reach the fully closed position. This modulation of the inlet guide vanes is graphically depicted in FIG. 12. The output signal or the megawatt characterized inlet guide vane positioning signal V1975 which results are forwarded from block 1528G to a high signal select block 1532G.

Figure 12:
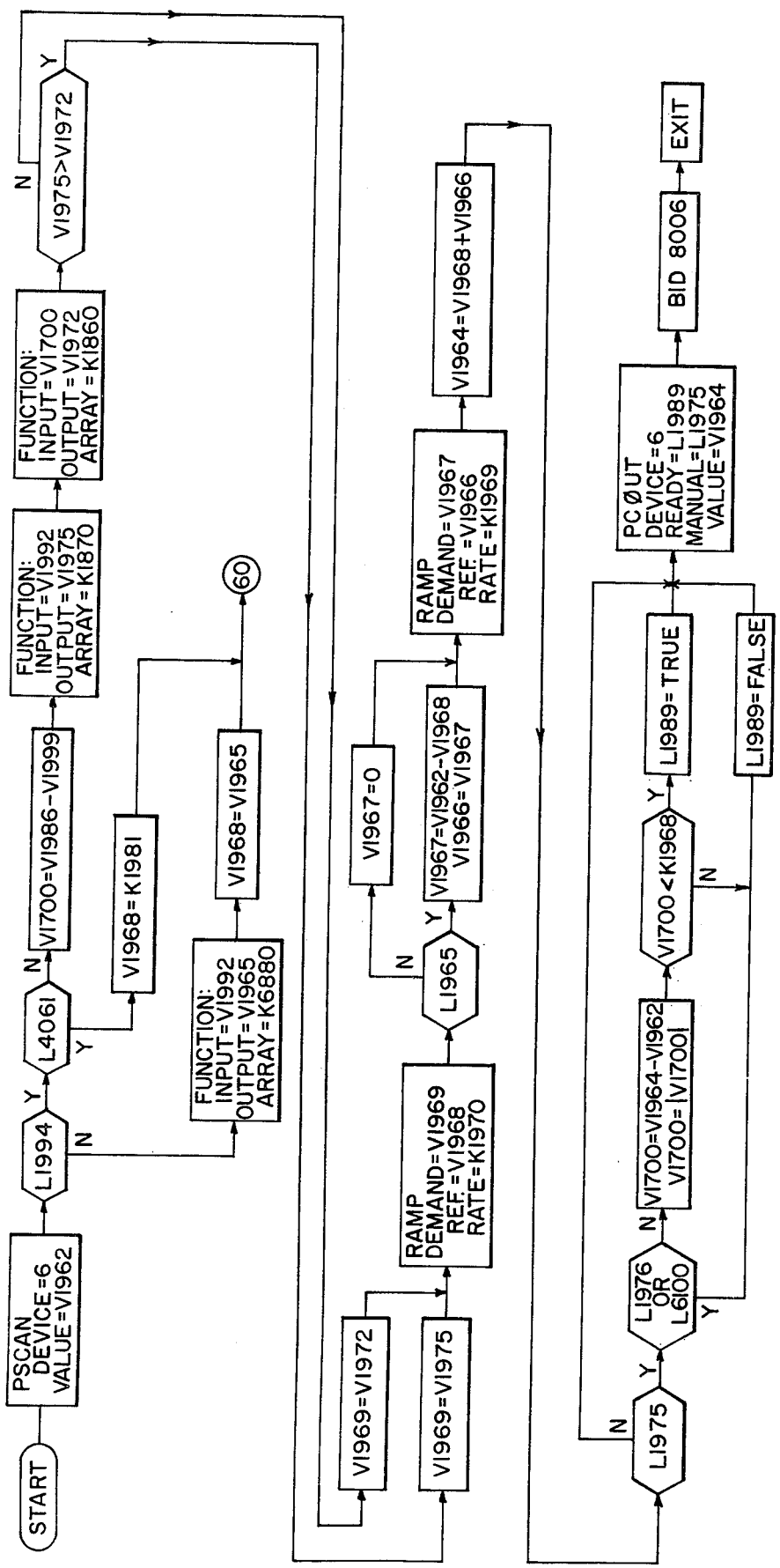
FIG. 12 is a flow chart representation of the functional operation illustrated in FIG. 11.

After the dry boiler interrogation has taken place and has been answered in the negative, the input V1700 to block 1530G, the blade path temperature error characterizing block, is also actuated. Input V1700, an internal real variable, is generated by taking the difference between the blade path temperature reference V1986 and the actual blade path temperature V1996 in difference block 1534G. The difference or error between the blade path reference and actual signals is forwarded from block 1534G, as V1700, to block 1530G. As is illustrated in FIG. 11, block 1530G develops a curve through the use of array K1860 which characterizes signal V1700 as a function of the blade path temperature error signal. Thus, as is shown therein, the inlet guide vanes are kept 100 percent open as the blade path temperature error decreases from 10°F. to zero. The guide vanes are ramped from a closed position to a fully open position as the blade path error temperature signal decreases from 60° to 10°F. Alternatively stated, the inlet guide vanes are kept closed until the blade path temperature error signal represents a difference of 60°. At that point, the inlet guide vanes are ramped from a closed to an open position until the error reaches 10°, at which time the inlet guide vanves are fully open and maintained so as the error diminishes to zero. As is shown in FIG. 12, the guide vanes are kept closed from the point at which generator loading reaches 20 megawatts to the point at which the blade path temperature error signal represents a difference of 60° between the reference signal V1986 and the actual blade path temperature signal V1996. When the 60° difference point is reached the guide vanes begin to open. Due to the fact that the blade path temperature error does not uniformly change in one direction the period between the point at which a 60° difference is reached and base load loading is achieved is characterized, as shown in FIG. 12, by a series of jagged lines when the inlet guide vanes are modulated or controlled by the output control signal which exits characterizing block 1530G as V1972. V1972, the inlet guide vane positioning signal developing block 1530G, is forwarded therefrom to the high signal select block 1532G.

The high signal select block 1532G compares signal V1975, the megawatt characterize guide vane positioning signal, and signal V1972, the blade path temperature error characterized inlet guide vane positioning signal, and selects the higher one of the two. As will be visually appreciated from FIG. 12 and the prior discussion, the high select block 1532G will be passing as signal V1969, the higher signal V1975, that signal generated by block 1528G during the period of operation from a four megawatt loading point until such time as the 60° differential between the blade path temperature reference signal and the actual blade path temperature signal is reached. At that point, the automatic control block 1504G begins to control in accordance with the characterization imposed by the blade path temperature error curve which is nested in block 1530G.

Because the signals V1972 and V1975 for modulating the position of the inlet guide vanes can undergo appreciable swings, in the order of 10 to 20 percent, a filtering or damping action is required. Consequently ramp block 1536G receives the guide vane positioning control signal V1969 and ramps this signal at a rate determined by K1970 so that swings thereof in either direction are damped or filtered to reduce their effect on the inlet guide vanes. Without such damping by the ramp block 1536G, the resultant abrupt and significant movement of the guide vanes will shock the turbine resulting in deleterious performance and possible turbine damage. The output of the ramped inlet guide vane positioning signal is denominated as V1968 and passes through point 1521G.

From point 1521G the guide vane positioning signal V1968 is passed to summing block 1538G and differencing block 1540G. At this time, the mode status of the inlet guide vane control apparatus 1500G is interrogated in decision block 1542G. If the control apparatus 1500G is in the automatic mode, or alternatively not in the manual mode, then a zero level signal is outputted by the constant generating block 1546G and forwarded to ramp block 1544G. Ramp block 1544G drives its output then to zero at a rate dictated by K1969 and adds the resultant value to the inlet guide vane positioning signal V1968 at the summing block 1538G. If the control apparatus 1500G is in the manual mode of operation, block 1542G passes to the ramp block 1544G, a difference signal V1967 which represents the desparity between V1962, the actual signal being fed to the inlet guide vane actuating mechanism 215, and V1968, the inlet guide vane positioning signal developed by the automatic control block 1504G. Difference signal V1967 is generated in the differencing block 1540G. The difference signal V1967 is fed to the input of ramp block 1544G and primes that block for subsequent operation when control system 1500G is transferred to the automatic mode of operation. As will be noted in FIG. 11, the inlet guide vane bias signal V1967 is also passed via line 1541G directly to the output of ramp block 1544G and one input of the summing block 1538G. Consequently, the output signal V1964 from summing block 1538G represents the total of the tracking bias signal V1967 and the inlet guide vane positioning control signal V1968 at all times.

If control apparatus 1500G is in the manual mode of operation, block 1542G passes a zero signal from block 1546G to the input of ramp block 1544G. Ramp block 1544G then reduces the inlet guide vane bias signal V1967 at a rate of 10 percent per minute towards zero. While this is occurring, the inlet guide vane bias signal is not passed to the output of the ramp block 1544G via line 1541G. Consequently, when in the automatic mode of operation, the output of summing block 1548G represents the sum of the inlet guide vane control signal V1968 and the decreasing tracking bias signal developed by the ramp 1544G.

If the control apparatus 1500G is in the automatic mode of operation signal, V1964 is passed through the ready output block 1548G directly to the input of inlet guide vane manual/automatic interface block 1508G. From there the inlet guide vane positioning signal is passed to the high select block 1514G as previously mentioned in connection with FIG. 10. If the control apparatus is in the manual mode of operation, then the ready/output block 1548G forwards a signal to the manual/automatic interface block 1508G to prime it for automatic mode operation to enable an indicator light at the operator's station 1502G which visually informs the operator that control can be transferred to the automatic mode.

FIG. 12 illustrates a lower level and more detailed arrangement of the automatic control block 1504G. The flow chart shown in FIG. 12 corresponds to the functional arrangement depicted in FIG. 11. The flow and utilization of the various real and logical variables employed therein as well as the different constants used in the flow chart is illustrated in FIG. 12. As previously mentioned, it will be readily apparent to one having skill in this art that the automatic control block 1504G, as depicted functionally and in a flow chart manner in FIGS. 11 and 12, is susceptable of many modifications and alterations including alternative implementation without departing from the spirit and scope of the present invention.

F. Inlet Guide Vane Control Apparatus - Manual Mode Functional Description

As previously noted, the inlet guide vane control apparatus 1500G is capable of operation in a manual mode. The following discussion presents the details of the manual mode of operation. It should be noted, that while the following description of the preferred embodiment of the manual mode of operation is generally implemented in an analog manner, alternative implementation or modification thereof is within the reach of one having ordinary skill in the art.

Figure 14A:
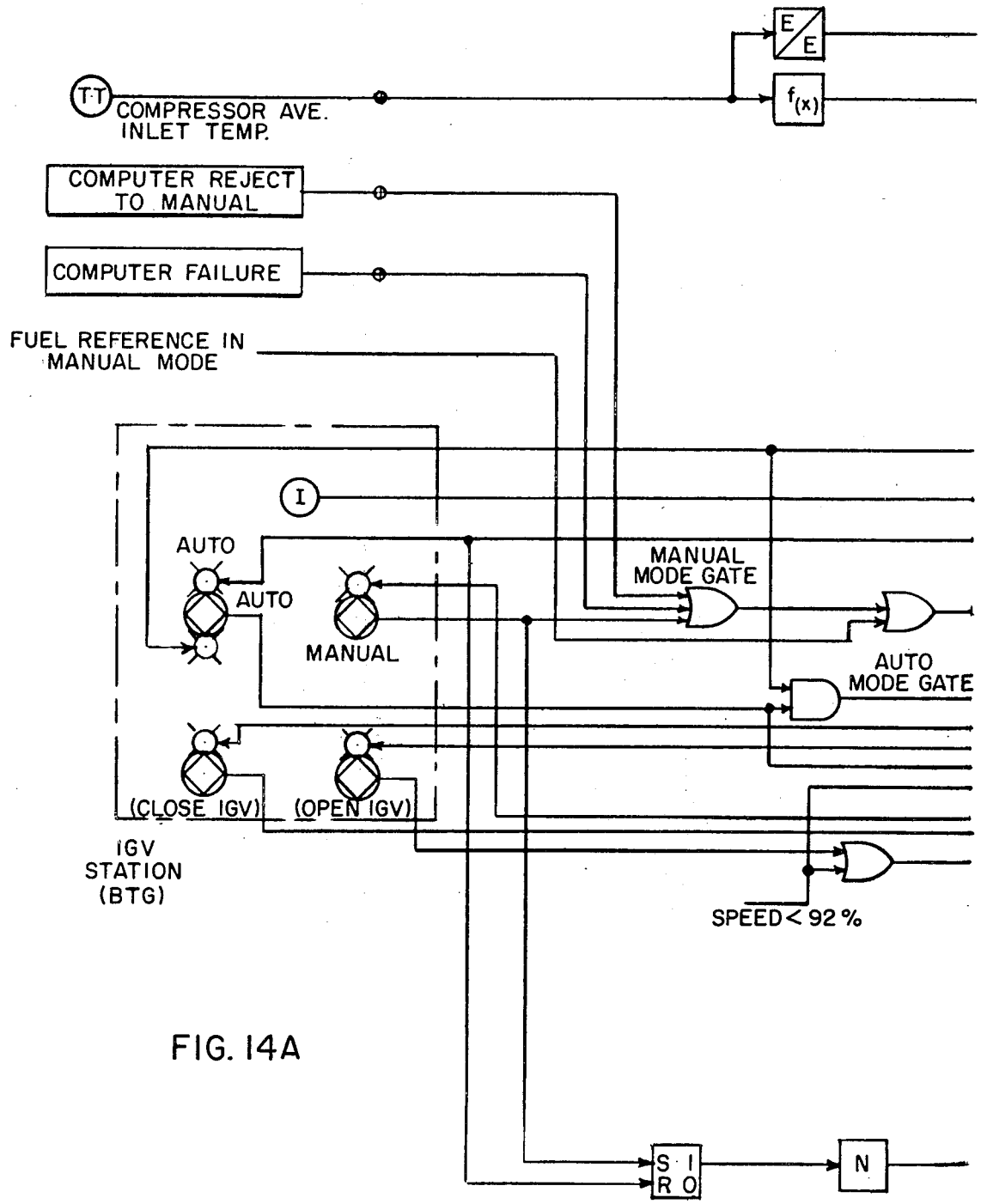
FIGS. 14A–C functionally illustrate the operation of the manual mode of the apparatus shown in FIG. 10 and its interrelation with the interface illustrated in FIG. 9.
Figure 14B:
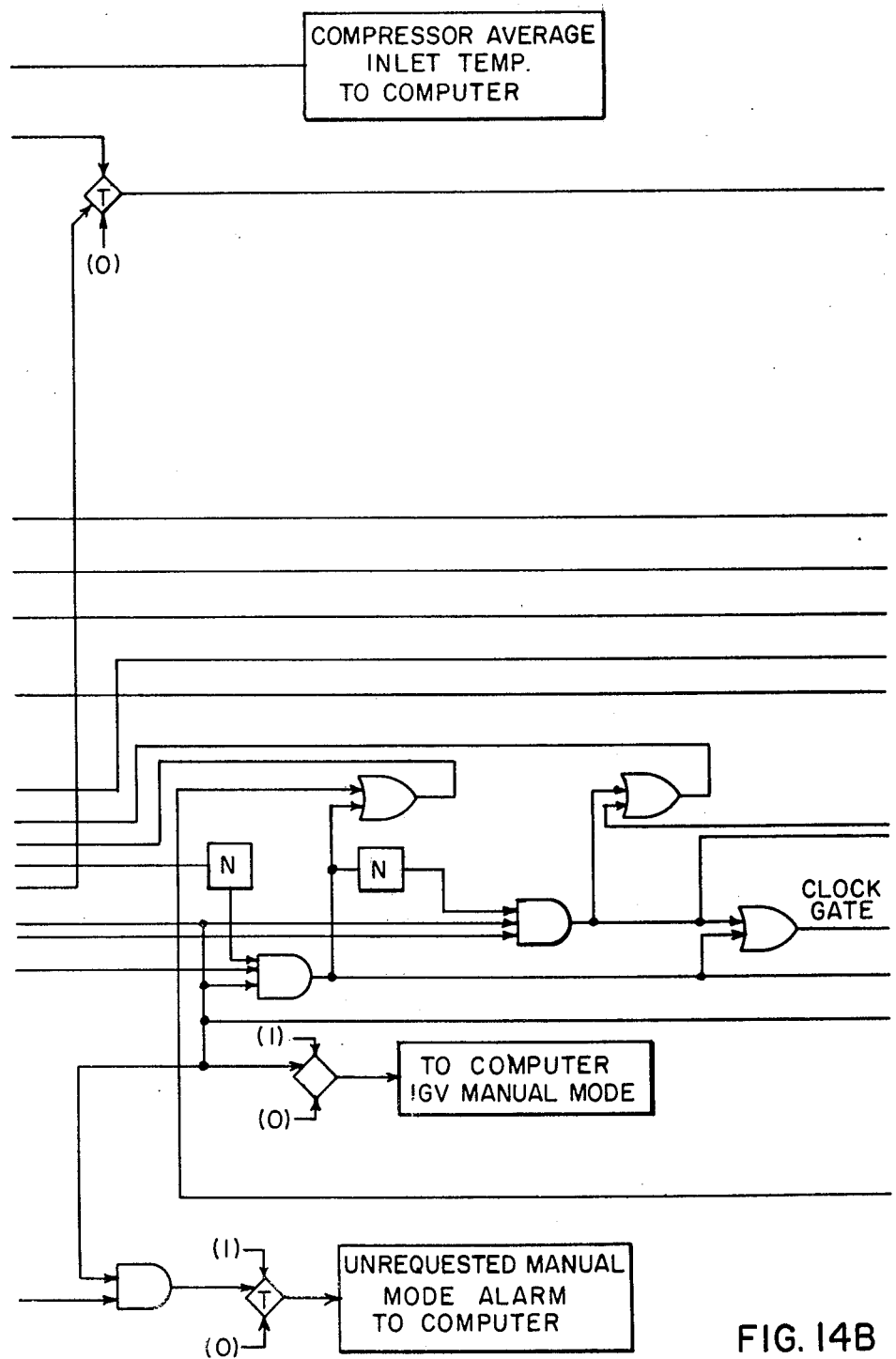
Figure 14C:
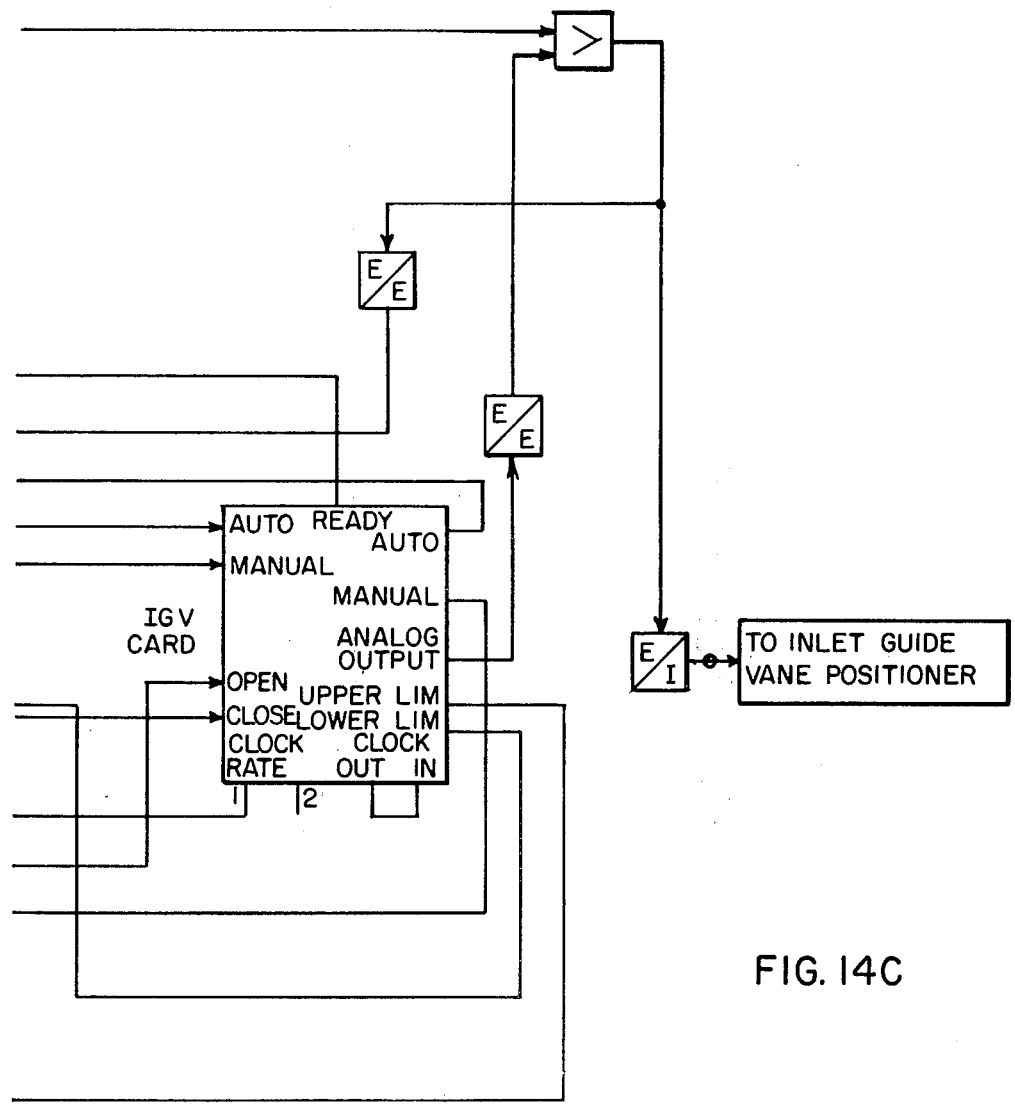

The functional and operational interaction of the various elements of inlet guide vane manual control block 1506G is illustrated in FIGS. 14A and 14B. It will be assumed, for discussion purposes, that the inlet guide vane control apparatus 1500G will be used to manually modulate the position of the guide vanes of gas turbine 12 from startup to base load conditions.

At startup, the operator will actuate manual pushbutton 1550G which is located at the inlet guide vane operation station 1502G. Once depressed or actuated, the manual pushbutton 1550G forwards a logical HI signal to the manual mode gate 1554G. This action sets the output of gate 1554G HI and, in turn, sets the output of OR gates 1556G to a logical HI. When this occurs, the input to the inlet guide vane manual-/automatic interface block 1508G is set. This action places the interface block 1508G in a manual mode condition and causes the manual output thereof to be set to a logical HI. When the manual output of the interface block 1508G is set HI, it causes the input to decision block 1560G to be likewise set which, in turn, forwards a logical HI signal to the inlet guide vane automatic control block 1504G (or the control computer) to inform it that the inlet guide vane control apparatus 1500G has been set to operate in the manual mode. At the same time, when the manual output of interface block 1508G is set HI, one input to AND gate 1558G is also set to a logical HI. Another input to AND gate 1558G is set HI through inversion gate 1568G, which reflects the fact that the inlet guide vane control apparatus 1500G has not been set to operate in the automatic mode of operation.

At startup, the analog center forwards a signal to OR gate 1556G, which input reflects the fact that turbine speed is less than 92 percent of synchronous speed. When this condition obtains, the output of OR gate 1556G is set HI, thereby setting the final input to AND gate 1558G to a logical HI. This causes the output of AND gate 1558G to be set HI which sets the inlet guide vane open contact of the interface block 1508G and primes it for subsequent action. In addition, when the output of AND gate 1558G is set HI, the output of the OR clock gate 1570G is also likewise set, which results in the internal clock of interface block 1508G being started. As a result, an analog output signal is generated which varies at a rate determined by the clock rate of the previously mentioned internal clock. The output from the interface block 1508G is passed via voltage-to-voltage isolation block 1572G and line 1517G to the high select block 1514G.

When the output of AND gate 1558G is set HI in the manner previously described, it also causes one input to OR gate 1574G to be similarly set, thereby causing indicator lamp 1564G at the operator station 1502G to be illuminated. This visually informs the operator that the guide vanes are being opened. When the gas turbine reaches 92 percent speed, the input line to OR gate 1556 changes state to a logical LO thereby disabling AND gate 1558G. As a result, the guide vanes will remain at the position they have reached due to the prior action of the open guide vane demand generated for the period between startup and the attainment of 92 percent gas turbine speed. When AND gate 1558G is disabled, it causes the output of OR gate 1574G to be set to a logical LO extinguishing indicator lamp 1564G. At this point then, the operator is aware that the guide vanes have been set to an open position corresponding to the attainment of 92 percent of synchronous speed by the gas turbine. To further open the guide vanes if necessary, the operator can now depress or actuate pushbutton 1562G on the operator's station 1502G.

When pushbutton 1562G is depressed, it causes the other input to OR gate 1556G to be set to a logical HI and as a result, enables AND gate 1558G in the manner previously described. In consequence thereof, the open demand line is set HI, the open input to interface lock 1508G is set and the internal clock thereof is started. In addition, as also previously described, indicator light 1564G is illuminated by the toggling of OR gate 1574G. It should be noted that as soon as the operator lifts his finger from the pushbutton 1562G, OR gate 1556G will be disabled, the open guide vane demand signal will go to zero and the indicating light 1564G will go out. When the upper limit or the fully open position of the inlet guide vanes has been reached, an appropriate signal indicative thereof is generated in the interface block 1508G and is forwarded from the upper limit terminal thereof to the other input of OR gate 1574G. This will turn on the indicating light 1564G, even though the pushbutton 1562G has been deactuated. Thus, when the upper limit or fully open position is reached by the inlet guide vanes the operator is made aware of this fact by the continued illumination of lamp 1564G even through pushbutton 1562G is no longer being depressed to call for further opening action.

In the manual mode of operation, unlike the automatic mode of operation, it is the operator's responsibility to close down the inlet guide vanes after synchronization and minimal loading has been achieved. Thus, referring to FIG. 13, once the guide vanes have reached their fully open position and 4 megawatt loading point have been reached, the operator so informed by the previously described indicating meters and/or indicating lamps will start to close down the inlet guide vanes until the 20 megawatt loading point is reached. At that time the operator will manually maintain the inlet guide vanes in a closed position until a point is reached at which the actual blade path temperature increases to within 60° of the blade path temperature reference. This point occurs at approximately 50 megawatts below base load, although this may vary according to ambient conditions.

In order for the operator to close or modulate the inlet guide vanes once the 4 megawatt loading point is reached, he will depress the close pushbutton 1578G which is physically located at the operator station 1502G. When this occurs, one input to AND gate 1578G is set HI, as is a second input thereto by the action of inversion gate 1576G, which action reflects the fact that AND gate 1558G is disabled. The third and final input to AND gate 1578G is set HI by the fact that the manual pushbutton 1550G has been actuated and the inlet guide vane control apparatus 1500G is in the manual mode of operation. With all three inputs set to a logical HI, AND gate 1578G is enabled which triggers the clock gate 1570G in a manner similar to that previously described for the open pushbutton 1562G operation and also sets the close input to the interface block 1508G. In addition, when AND gate 1578G is enabled, it sets one input to OR gate 1582G which, in turn, illuminates or turns on the indicating lamp 1580G associated with pushbutton 1578G. This serves as a visual indication to the operator that the requested action of closing the inlet guide vanes is being accomplished. When the lower limit or fully closed position of the inlet guide vanes has been reached, the interface block 1508G generates a signal indicative thereof which is forwarded to OR gate 1582G. Now, also as in the manner previously described with respect to the indicating lamp 1564G, indicating lamp 1580G is maintained in a lit state even though the operator may have lifted pushbutton 1578G. This action visually informs the operator that the lower limit or fully closed position of the inlet guide vanes has been reached and that further depression or actuation of the close pushbutton 1578G is no longer needed.

The manual mode of operation for the inlet guide vane control apparatus 1500G may also result from the enabling of manual mode gate 1554G for a reason other than actuation of the manual pushbutton 1550G. As is shown in FIGS. 14A and 14B, for example, if the inlet guide vanes were being controlled in the automatic mode and a computer failure occured, a computer reject to manual signal would be generated thereby setting one of the inputs to manual mode gate 1554G to a logical HI causing the inlet guide vane control apparatus 1500G to be shifted from the automatic to the manual mode of operation. Similarly, computer failure itself may cause another input of the manual mode gate 1554G to be set to a logical HI also causing a shift from automatic to manual mode of operation. In addition, if the fuel reference or control has been placed in its manual mode of operation, another input to OR gate 1556G is set to a logical HI which again results in a transfer of the inlet guide vane control apparatus 1500G to its manual mode of operation.

The inlet guide vane positioning signal is forwarded from the analog output of the interface block 1508G via line 1517G to the high signal select block 1514G. Assuming that this is the higher of the two signals received by HI select block 1514G, it is passed via line 1511G and the volt age-to-current isolating block 1582G to the inlet guide vane actuating mechanism 215. The signal which appears on line 1511G is also fed back to the operator's station 1502G, via the voltage-to-voltage isolation block 1584G. It is received at the operator's station 1502G and utilized to actuate indicator 1586G, which gives the operator a visual indication of the position of the inlet guide vanes since it is calibrated in degrees of position thereof.

Alternatively, at startup, the operator may choose to have the inlet guide vanes positioned automatically. Once he ascertains by reference to the ready light 1594G that automatic control is possible, he will depress the automatic mode pushbutton 1588G. As previously noted in the foregoing discussion of the operation of the inlet guide vane automatic control block 1504G, ready light 1594G is illuminated by the interface block 1508G to visually indicate to the operator that the inlet guide vane control apparatus 1500G can be placed in its automatic mode of operation. Actuation of the automatic mode pushbutton 1588G sets one input of the automatic mode gate 1592G to a logical HI. The other input of the automatic mode gate 1592G has already been set HI by the same signal which enables the ready light 1594G. As a result of this action, the output of the automatic mode AND gate 1592G is set HI causing the auto input to interface block 1508G to be set. This action, in turn, causes an auto signal to be generated by the interface block 1508G, which signal is returned to the operator's station 1502G and employed thereat to enable indicating lamp 1590G which visually informs the operator that the inlet guide vane control apparatus 1500G is now operating in its automatic mode.

In automatic operation, if the inlet guide vane automatic control block 1504G (the control computer) does not update the interface block 1508G within a predetermined time period, the control apparatus 1500G is returned to the manual mode of operation by an internal keep alive circuit housed within the interface block 1508G. This return to the manual mode of operation is accomplished in the following manner. When the manual pushbutton 1550G is depressed, in addition to the action previously described as a result thereof, the set input of flip-flop 1591G is actuated causing the output thereof to be set to a logical HI. As a result, signal inversion block 1593G forwards a logical LO to one input of AND gate 1595G. The other input to AND gate 1595G reflects the state or mode of operation of the inlet guide vane control apparatus 1500G. When the keep alive circuit is actuated as a result of not having received an update within the allowed time period, the interface block 1508G outputs a signal on its "manual" line which sets the second input to AND gate 1595 to a logical HI. Simultaneously, the "auto" output of the interface block 1508G is reset from a logical HI to a logical LO. This causes the reset input to flip-flop 1591G to be triggered which, in turn, causes the output thereof to be set to zero or a logical LO. When this occurs, the inversion action of block 1593 sets the other input of AND gate 1595 to a logical HI and enables AND gate 1595G since its other input has previously been set HI by the action of the keep-alive circuit. Once enabled, AND gate 1595G forwards a logical HI signal through decision block 1597G which informs the automatic control block 1504G that an unrequested manual mode call has been made. This alarms the inlet guide vane automatic control block 1504G so that it may be made aware of the fact that transfer to manual mode of operation has occurred. Once the automatic control block 1504G has finished whatever housekeeping chore might have prevented the updating of the interface block 1508G, the inlet guide vane control apparatus is made ready for a return to the automatic mode of operation.

Figure 15A:
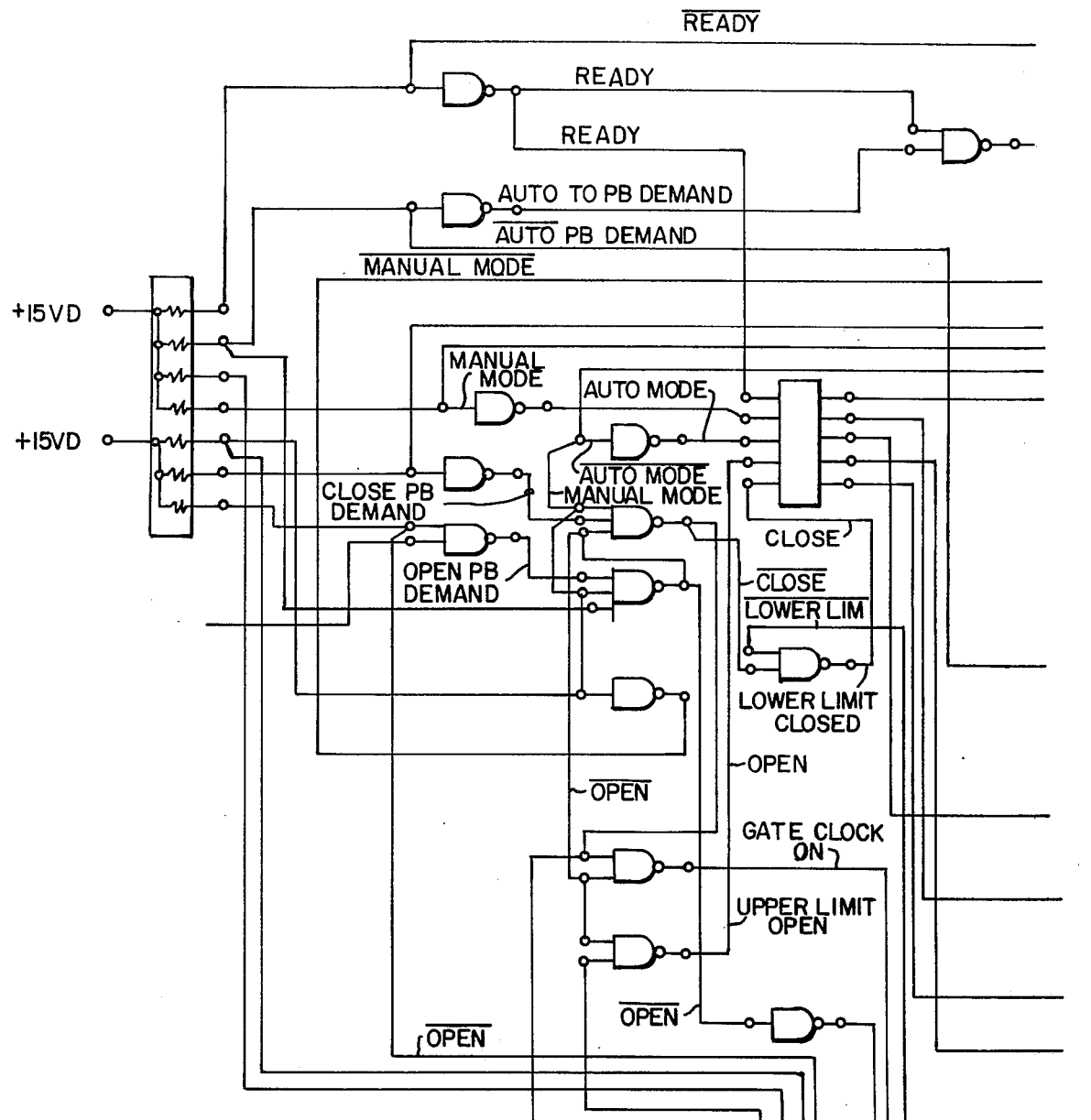
FIGS. 15A–E show the more detailed electromechanical and assembly features of the arrangement and interface illustrated in FIGS. 14A–C.
Figure 15A:
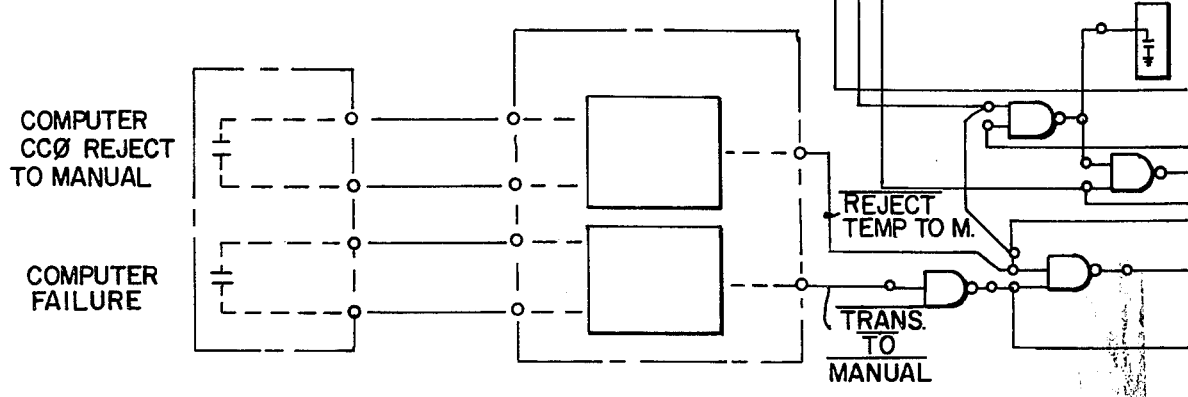
Figure 15B:
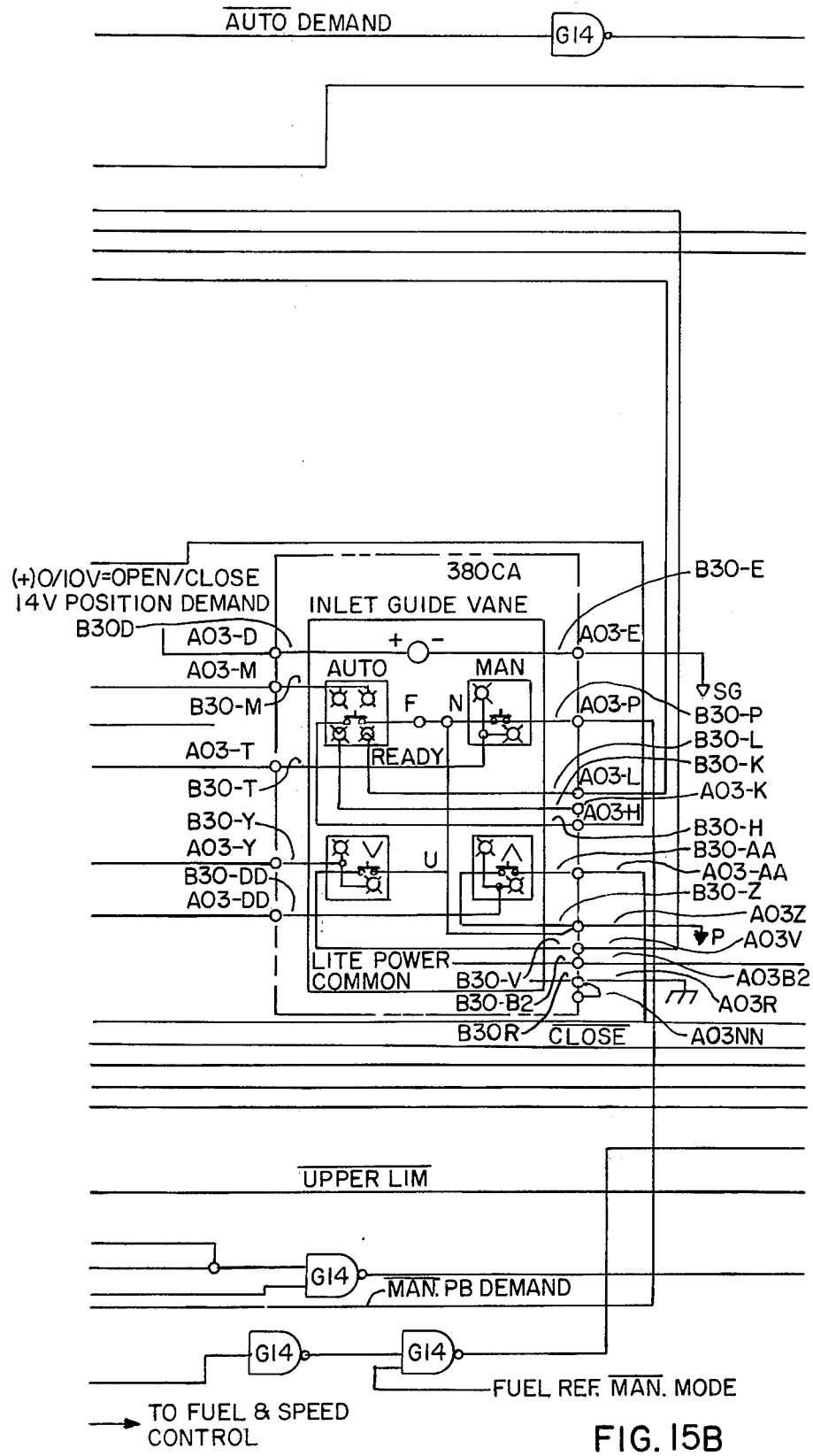
Figure 15C:
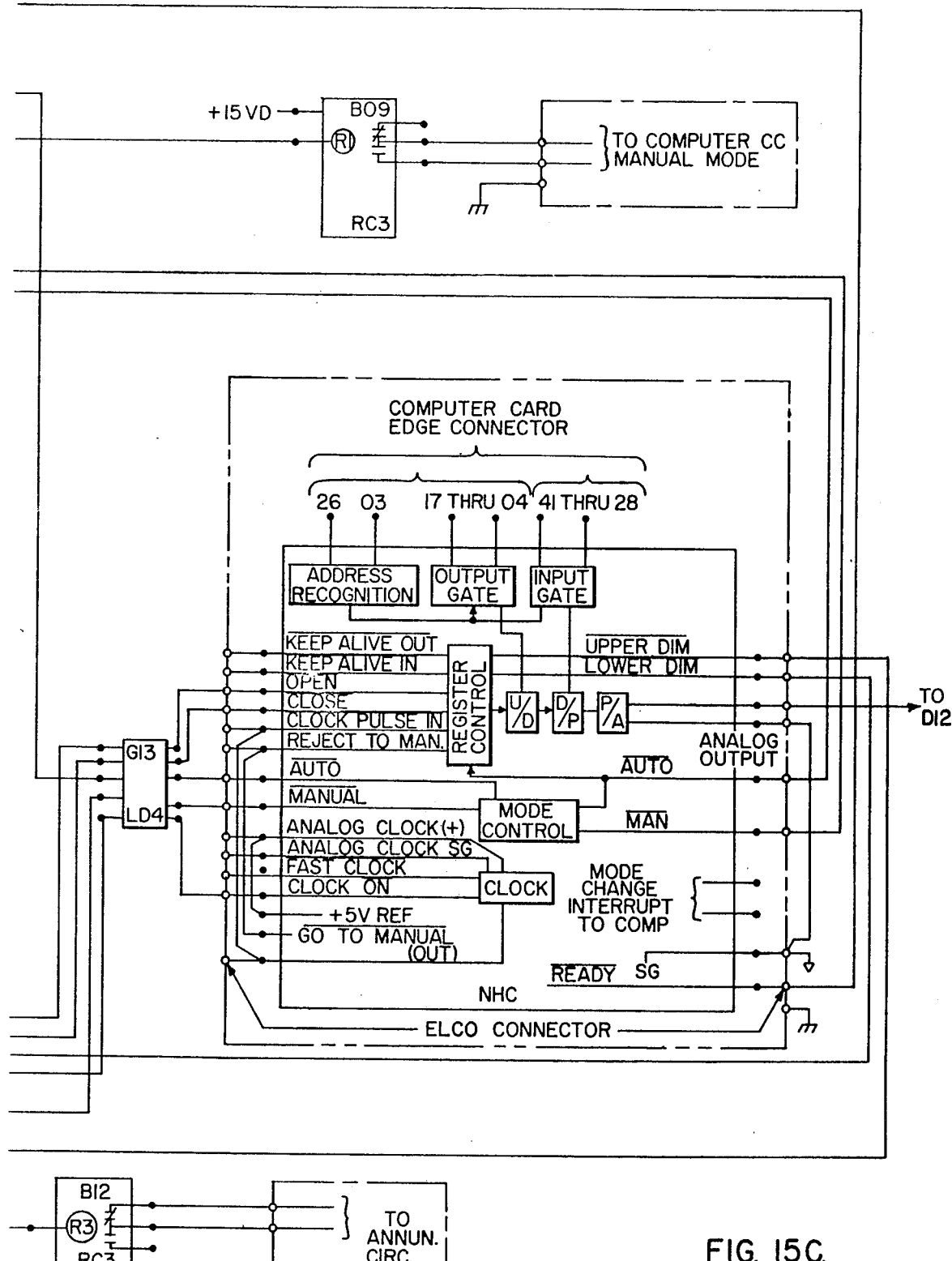
Figure 15D:
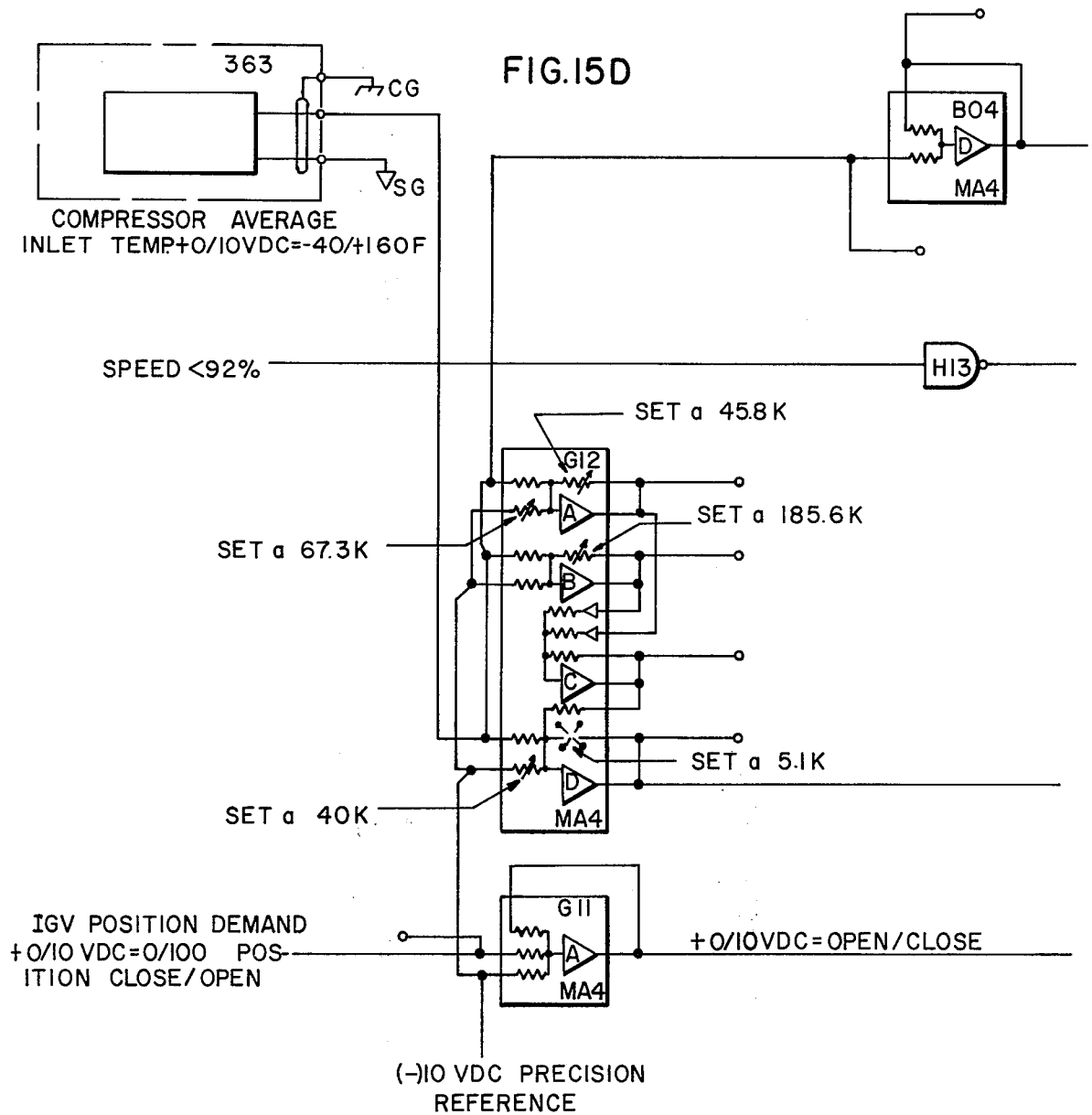
Figure 15E:
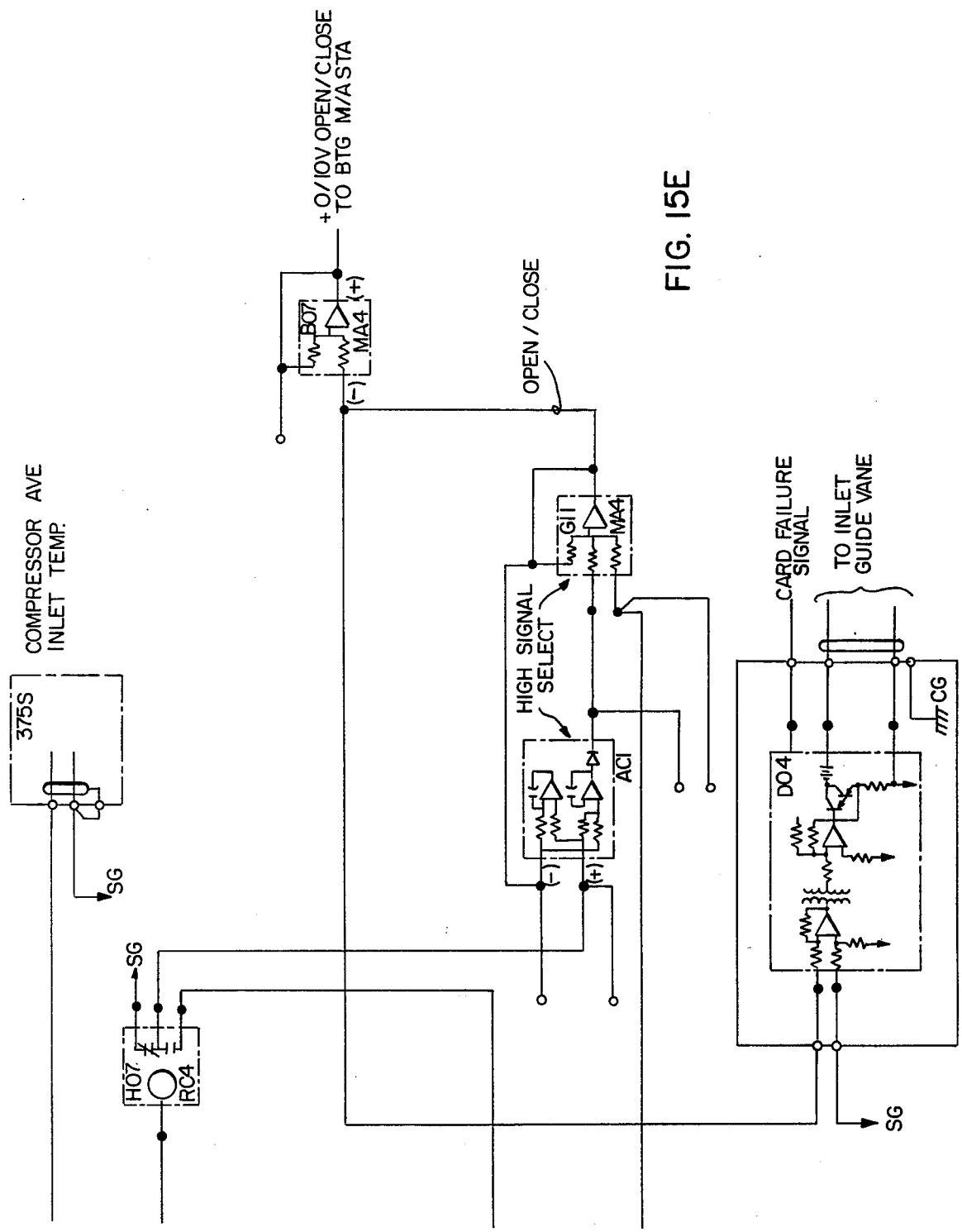

As previously explained, FIGS. 14A and 14B illustrate the interconnection and functional cooperation of the various elements which assist in or comprise the manual control block 1506G of the inlet guide vane control apparatus 1500G. A more detailed and exhaustive illustration of the electromechanical interconnections and wiring can be found in FIGS. 15A 15B, and 15C. Reference may be had thereto for the mechanics of interconnection wiring and such other related details.

G. Inlet Guide Vane Control Apparatus - Gas Turbine Exhaust Flow Matching

Figure 16A:
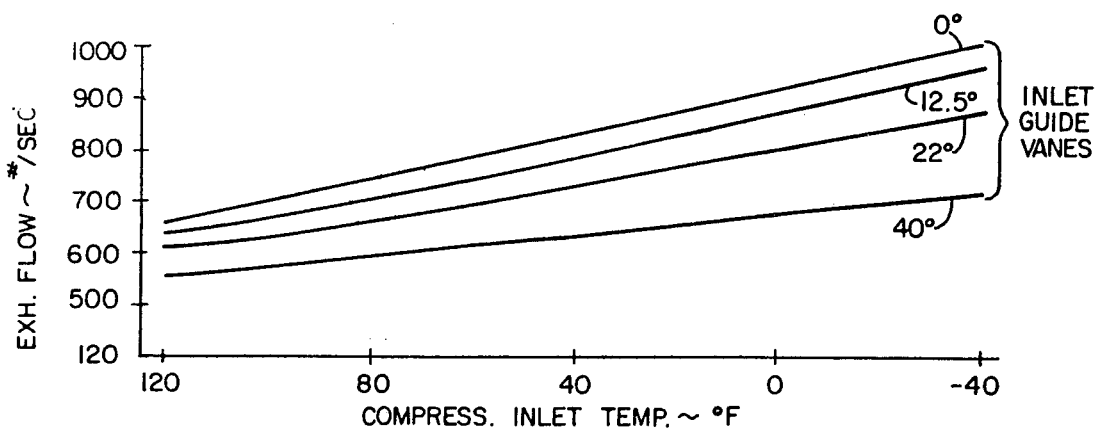
FIG. 16A graphically illustrates the effect of reduced compressor inlet temperature on gas turbine exhaust flow.
Figure 16B:
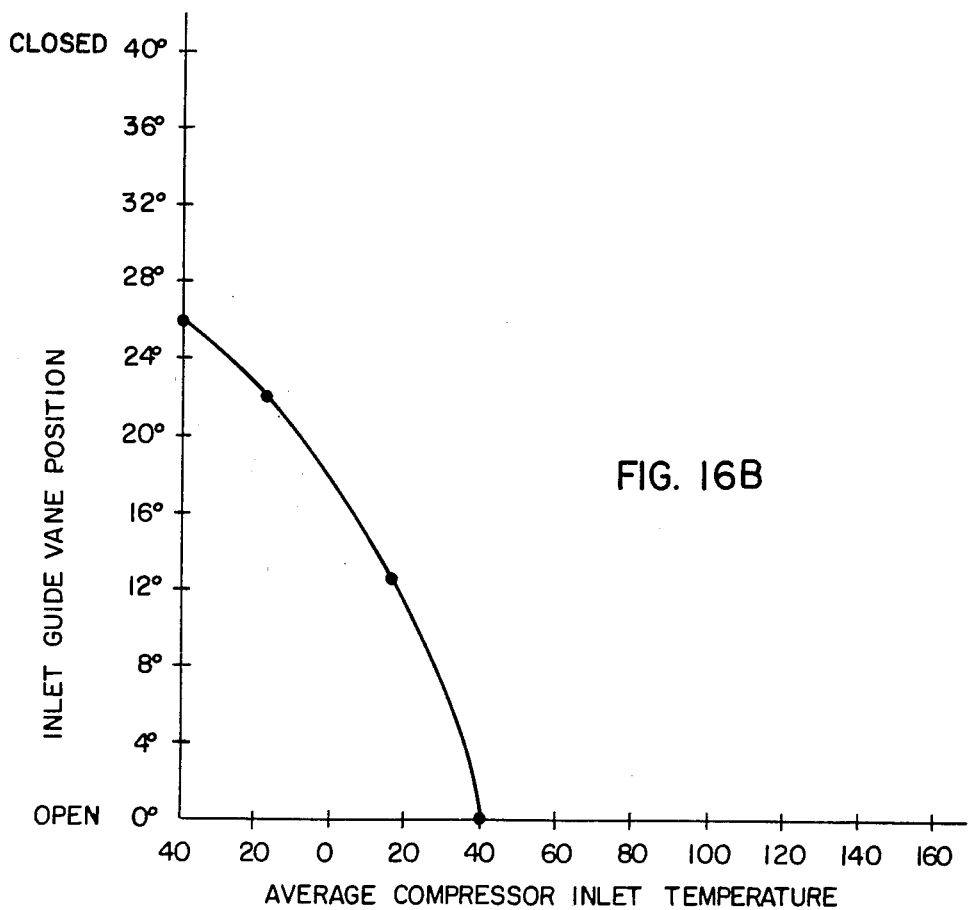
FIG. 16B graphically illustrates a preferred curve for characterizing the average compressor inlet temperature for use in the exhaust flow matcher shown in FIGS. 10 and 14A–C.

As previously noted, the design of a combined cycle power generating plant requires proper matching between an included gas turbine and its associated steam generator. One item in connection therewith which requires special attention is that of gas turbine exhaust flow. As is illustrated in FIG. 16, for a constant setting of the inlet guide vane position, the mass flow exhausted from the gas turbine increases as the compressor inlet temperature or the ambient temperature decreases. For example, at a 0° setting of the inlet guide vanes, the mass of the exhaust flow will increase at 40°F from approximately 840 pounds per second to a flow of 1000 pounds per second at −40°F. Since the afterburner firing rate is held constant in the control scheme utilized in the previously described combined cycle plant, the increased mass flow as compressor inlet temperature decreases will result in an increased steam flow from the boiler but with a lower steam temperature. The subsequent downstream effect of such lowered steam temperature will result in the condensation of a portion of the steam and a water problem within the steam turbine.

To avoid this potential problem, the inlet guide vane control apparatus is provided with a gas turbine exhaust flow matching block 1512G (FIG. 10) which prevents the occurrence of condensation or water problems in the steam turbine. The gas turbine exhaust flow matching block 1512G operates in the following manner. Referring again to FIGS. 14A and 14B, there is illustrated a compressor average inlet temperature sensor 1559G which forwards via line 1561G a signal indicative of the average compressor inlet temperature. This signal representative of compressor average inlet temperature is characterized in function generator 1563G in accordance with the curve shown in FIG. 16B. This curve can be approximated by a three straight line function generator or may be made linear or nonlinear depending upon the degree of accuracy desired. Once characterized by the function generator 1563G, the compressor average inlet temperature signal is forwarded to decision block 1567G. If the gas turbine speed is below 92 percent of synchronous speed, decision block 1567 passes a zero signal via line 1515G to the HI signal select block 1514G. Under conditions of less that 92 percent of synchronous speed, the HI select block 1514G will pass the signal it receives from the interface block 1508G to the inlet guide vane positioning mechanism 215. However, once the gas turbine reaches 92 percent of synchronous speed decision block 1567G will pass an inlet guide vane characterized temperature signal via line 1515G to the HI select block 1514G. When the 92 percent speed condition or higher obtains, the HI select block 1514G will then pass whichever is the higher one of the two signals it receives to the inlet guide vane positioning mechanism 215.

H. Inlet Guide Vane Control Apparatus - Manual-/Automatic Interface (NHC card)

An NHC card (FIG. 8) converts a 12 bit binary number from the computer to an analog output signal. This card operates in either the manual or the automatic mode. In the automatic mode, the NHC card output can be set or read by a computer peripheral channel. In the manual mode, the NHC card output is controlled by signals generated outside the computer which raise or lower the output.

In automatic operation, if the computer does not update the NHC card within a set time period, the card is set to the manual mode by an alive circuit. The alive circuit has a timing device which can be set for 1, 5, or 20 seconds. The time period is selectable by resistor and capacitor values.

In manual operation, clock pulses determine the rate of change of the analog output signal. The clock pulses may be generated by either an external or an internal clock.

When an external clock is used, pin 6 is not grounded and no connections are made to pins 4 and 5. The external clock pulses must have a pulse width of 10 sec or more and a frequency of less than 4010 Hz. The external clock output is connected to pin 40.

When the internal clock is used, pin 11 is connected to pin 40. The internal clock has five ranges, each selectable by plugging in a certain resistor-capacitor combination. Each range has a fast clock operation and a slow clock operation. The slow clock operation is the normal range, and the fast clock operation is generated when a ground is applied to pin 9. In this case, the fast clock operation is initiated by a digital or logic signal and it is about 60 times faster than the slow clock operation. An analog input is also provided for the NHC clock to provide for rate variation in the slow clock operation or the fast clock operation.

The clock outputs of up to 5 NHC cards can be bussed together; thus, the number of clock rates available is twice the number of cards. One clock at a time can be enabled; each clock can produce two preselected clock rates. The internal clock can be connected to run at either a fixed rate (pin 5 connected to pin 38, and ground pin 4) or at a rate that increases exponentially with the time that the clock is enabled (pin 7 connected to pin 5, and ground pin 4). The clock can also be connected to run continuously (pin 6 connected to ground) or it can be connected to run only when externally generated raise or lower signals are generated.

TABLE OF CONNECTIONS

Power and Ground

| PIN | MNE-MONIC | FUNCTION |
|---|---|---|
| 1 | PR1IPS | +26 V Primary Supply |
| 2 | PR2IPS | +24 V Backup Supply |
| 25 | PSCOPR | Power Supply Common |
| 1 | PA1IPS | +26 V Primary Analog Supply |
| 2 | PA2IPS | +24 V Backup Analog Supply |
| 3 | PSCOPR | Power Supply Common |
| 42 | SCCOAR | Signal Common |

Input Signals

| PIN | MNEMONIC | FUNCTION |
|---|---|---|
| 4–17 | OD00-OD13 | Computer Output |
| 3 | | Address Source |
| 4 | CLKIAR | Clock Return RIM |
| 5 | CLKIAS | Clock Source RIM |
| 6 | | Clock Enable |
| 8 | CPBIDL | Clock Enable DIM |
| 9 | FPBIDL | Fast Clock |
| 12 | | Alive Input |
| 35 | GTMIDL | Go To Manual Input |
| 36 | MPBIDL | Manual |
| 37 | SPBIDL | Auto |
| 39 | RPBIDL | Raise |
| 40 | CLKIDL | Clock Input |
| 41 | LPBIDL | Lower |

Output Signals

| PIN | MNEMONIC | FUNCTION |
|---|---|---|
| 26 | | Address Return |
| 28–41 | ID00-ID13 | Computer Input |
| 7 | | T² Output |
| 10 | CTLODL | Control Source |
| 11 | CLKODL | Clock Output DIM |
| 13 | GTMODL | Go To Manual Output |
| 14 | LWRODL | Lower Limit |
| 15 | CTLODR | Control Return |
| 16 | CNTODR | Count Return |
| 17 | CNTODL | Count Source |
| 18 | RDYODL | Ready |
| 19 | | Alive Input |
| 21 | UPRODL | Upper Limit |
| 22 | RPTODR | Interrupt Return |
| 23 | RPTODS | Interrupt Source |
| 25 | AUTODL | Auto Indication |
| 26 | MANODL | Manual Indication |
| 32 | VLTOAS | Analog Source RIM |
| 34 | VLTOAR | Analog Return RIM |
| 38 | | +5 V Ref |

Automatic Operation

FIG. C6A shows a block diagram for the NHC card. The computer uses a 14 bit word to send and receive data and status. When the address recognition circuit senses that the computer is addressing the NHC card, it gates the data and status bits through the output gates. The status bits are routed to the register control and the data bits are routed to the up/down counter. The status bits are decoded and appropriate action is taken. The output of the up/down counter (which contains the last word from the computer) is converted to a pulse train by the digital/pulse converter. The pulse train is then converted to an analog signal. The output of the up/down counter and the status bits are routed to the input gates and sent to the computer.

Manual Operation

In the manual mode, the count in the up/down counter is regulated by external raise (RPBIDL) and lower (LPBIDL) signals generated either by pushbuttons from a manual/automatic control station or by logic circuitry. The clock will increment or decrement the counter as long as the raise or lower signal is present. Roll over is inhibited; that is, the up/down counter cannot count past 4095 or below 0. The clock rate, which is adjustable by analog control, i.e. by means of a variable voltage at pins 4 and 5, determines the amount of time it takes to change the signal level. When the raise or lower signal goes low, i.e. logical zero, the count in the up/down counter is held; thus, the analog output signal remains constant at that level. The D/A register consists of a set of binary up/down counters which accept parallel data and act as latches in the Automatic mode. In Manual mode the operator (or external logic) has control of the counters and can count them up or down. The raise/lower logic and the clock control this process. The raise and lower inputs control which direction the counters move. The counting rate is determined by the clock. If both raise and lower are enabled simultaneously the counters will do nothing.

Manual/Auto Transfer

If forced to Manual mode, the analog output signal remains unchanged at its last value until increased or decreased manually; thus, the transfer is bumpless. The external interrupt alerts the computer to a change in the card's operating mode. It is activated when the card goes from Auto to Manual or from Manual to Auto for any reason. A manual to auto transfer may be initiated only by the operator depressing the Auto pushbutton. The card will remain in Manual mode if any internal or external Go To Manual signal exists. A Ready output indicates that the card is in Manual mode and that no Go To Manual signal is present. The card can be forced to Manual by a Go To Manual signal. An internal Go To Manual is generated by the computer outputting a Go To Manual status, by either a Raise or Lower input, or by the Keep Alive circuit. After an Auto to Manual transition, the last number set in the D/A register by the computer remains until changed by the operator.

Automatic Operation

The digital input (pins 4 through 15) is gated into the register control (W83-1, 2, and 3) by a signal GATE DATA. The output of the register control is routed to the up/down counter register (W122-1 and 2) which is pulsed by a clock circuit consisting of W105-1 and C117-2. The clock pulses cause the up/down counter register to count, beginning with the value entered. During the counting, a pulse train is produced at the output (W122-2, pin 6) which is representative of the binary value of the original value entered.

The pulses (PULSE) are routed to the Pulse-to-Analog converter (S19-1 and associated components). The pulses are converted to an analog voltage level by the averaging circuit C113-1 and R356-3. This signal is routed to a DIM driver which provides the 0 to +10.5 V output (VLTOAS-VLTOAR) at pins 32 and 34.

The data going into the up/down counter are made available to the computer via drivers W135-1, 2, 3, and 4. This provides a means for the computer to check the data.

Two flip-flops (W28-2) and logic gating (W9-3) are used to monitor signals AUTO and $\overline{\text{AUTO}}$. These signals will change state when the operating mode switches from manual to automatic or automatic to manual. Any time such a change occurs, an external interrupt (RPTODS) is generated to inform the computer.

The alive circuit causes the NHC Card to go to manual mode if the computer does not sent data within a specified time (1, 5, or 20 sec) as determined by resistor RA and capacitor CA. This circuit is operational only when pin 19 (alive output) is jumpered to pin 12 (input of the driver that generates the Go To Manual GTMODL signal). The alive circuit monitors the status bits. Each time the status is changed, flip-flop W38-1 causes capacitor CA to charge. The keep-alive output signal is generated when capacitor CA discharges before the status bits are changed.

Manual Operation

Manual operation is initiated by signal GTMIDL (Go To Manual). Signal GTMIDL can be connected to pin 35 from an external source, or it can be connected to pin 35 from pin 13 (W134-3).

During manual operation, the register control (W83-1, 2, and 3) acts as a counter controlled by two NAND gates (W27-3). The direction of the counting is controlled by signals UP and DN generated by driver and logic circuitry. The input signals to the drivers (RPBIDL and LPBIDL) are generated externally.

Either an external clock or the internal clock can be used. If an external clock is used, it is connected to pin 40 (CLKIDL). If the internal clock is used, pin 11 (CLKODL) is jumpered to pin 40. The internal clock requires an input voltage source to pins 4 and 5 (CLKIAR and CLKIAS). If the +5 V REF at pin 38 is connected to pin 5, the clock will run at a fixed rate. If the $T^2$ output (pin 7) is connected to pin 5 and pin 4 is connected to ground, the clock frequency will increase exponentially as a function of the time that either the UP or DN signal is present.

The rate multiplexer and the remaining circuits operate as described for the automatic operation.

I. Control And Logic Chains

The following control and logic chains are employed in utilizing the present invention. Further details thereof may be had by reference to W.E. 44,522.

1. Inlet Guide Vane Auto Manual Logic

The inlet guide vane (IGV) auto/manual logic responds to changes in state of the IGV nuclear hybrid coupler (NHC) card, whose output positions the inlet guide vane. When the IGV control station is on manual the operator positions the guide vane with manual raise and lower buttons. The control computer system tracks this operation and turns on the ready lamp to indicate that it is prepared to take control automatically with a bumpless transfer. When the IGV control station is on auto the control computer positions the guide vane as a function of existing conditions in the gas turbine.

FIGS. 17A-B show that the IGV auto manual logic is bid by an interrupt generated by the NHC card circuitry. When the IGV control transfers from auto to manual, or from manual to auto, this hardware produces a unique interrupt which is detected, scanned and identified by the computer interrupt system. The operating system monitor in turn executes a bid of this IGV auto manual chain, which then scans the HNC card auto manual status bit and bids an additional control chain if the card has transferred to manual.

The flow chart for the IGV auto manual logic indicates that the PCSTAT algorithm is executed with the NHC card device number = 6 and a manual status logical variable L1975. The algorithm scans the card and places the status in L1975, which is then interrogated. Should the card be on manual, L1975 is true, in which case a bid is placed for the coordinated control logic chain 901F. This software then aligns the coordination system to the new state of the inlet guide vane control level.

Should the NHC card be on automatic control, L1975 is false, in which case the result of the interrogation is simply to exit from this chain, since the remaining parts of the automatic control system will take the correct action now that the IGV is on auto.

2. Speed Monitor

Figure 18:
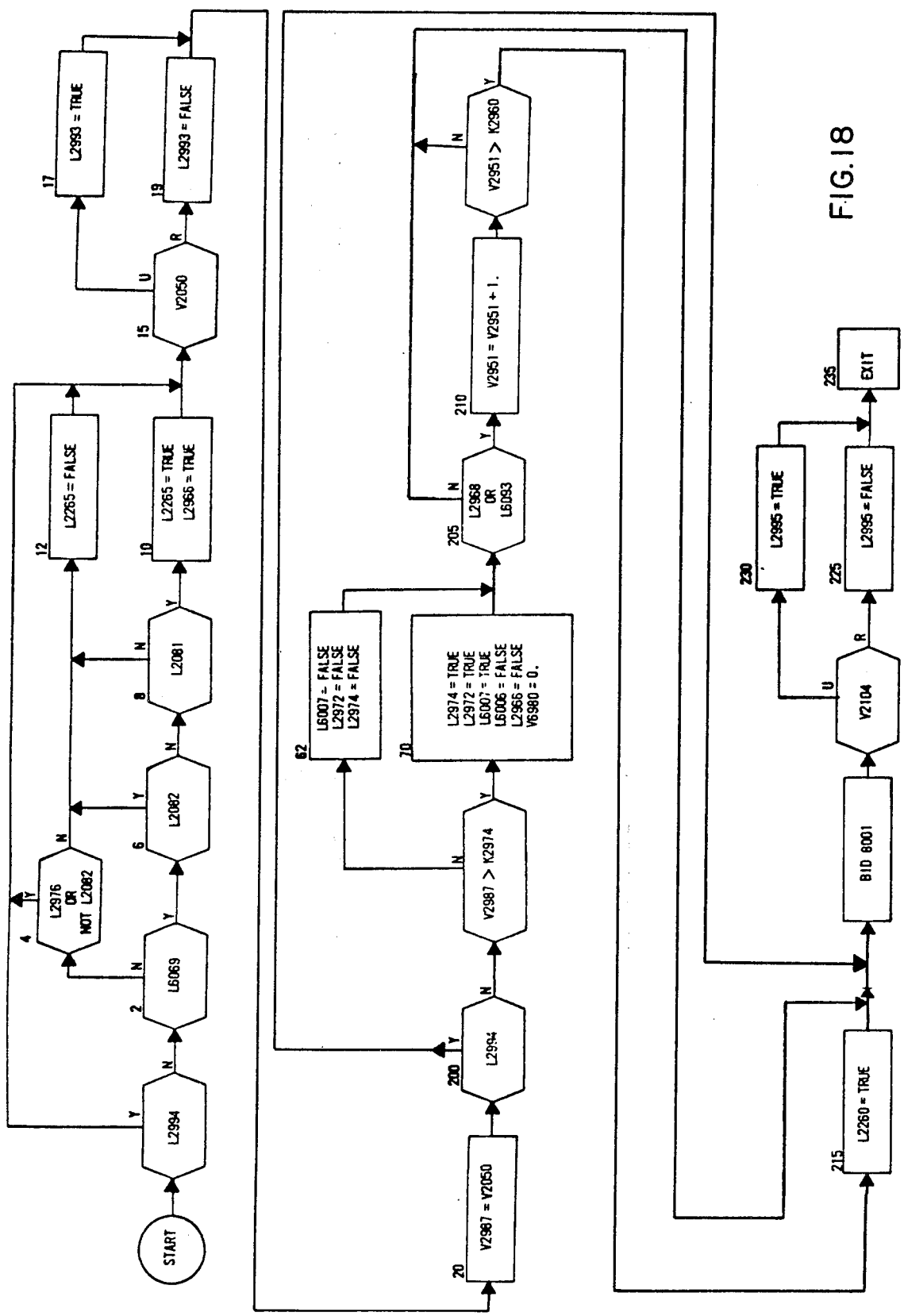
FIG. 18 illustrates a speed monitor chain employed in the utilization of the present invention.

The first major section is chain 8006, as illustrated in FIG. 18 is a check to see if the auto start or the start logical variables should be set ture. These two logicals are set true provided that the following conditions are met: the breaker is open, the unit is in coordinated control, the start relay, 4X, represented as logical variable L2082 is not true and the unit has reached hot standby status. If all these conditions are met the variables L2265, auto start, L2966, L1966, start, are set true.

The chain then proceeds to a section where speed, V2050, is checked for reliability and logical variable L2993, speed unreliable, is set true or false accordingly. The selected speed V2987 is then set equal to speed V2050.

A check is now made on breaker status and if the breaker is found to be closed the chain proceeds to label 220, otherwise a further speed check is performed to determine whether the unit has reached synchronous speed. Logical variables for various panel indicators such as the sync speed lamp and for interface contacts with the synchronizer are set true or false as a result of this check. After the synchronous speed check comes a section of the chain which examines the auto stop, L2968 and normal stop, L6093, logical variables. If either has been set for some number of passes through the chain a stop logical variable L2260 is set true. The program now goes to label 220 where it bids for the temperature control chain 8001 and checks the megawatt reading for reliability before exiting.

3. Blade Path Exhaust Temperature Control

Figure 19:
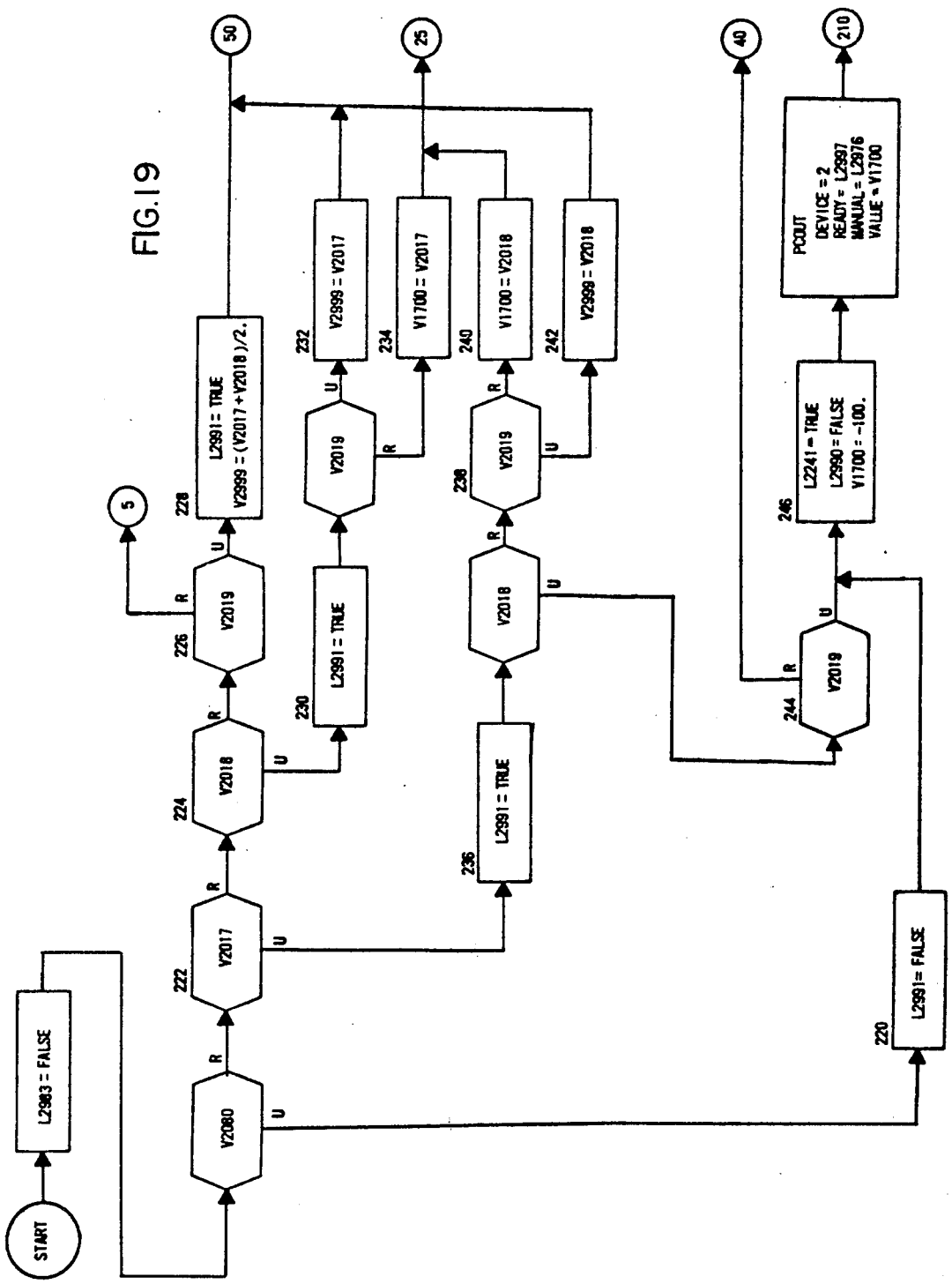
FIG. 19 depicts a blade path exhaust temperature control chain employed in the utilization of the present invention.

The blade path exhaust temperature control calculations and checks are performed in chain 8001, as shown in FIG. 19. Prior to doing any calculations, the chain checks the reliability of the input variables it will use such as combustor shell pressure and blade path temperature averages 1, 2 and 3. If the pressure reading is found to be unreliable, the chain sets an appropriate alarm bit and immediately exits, but if a temperature average is found to be unreliable the program sets an alarm logical variable and forms an average of the remaining good temperature readings; however, should no temperatures be reliable, the chain again sets an appropriate alarm bit and exits. The temperature input used in the following calculations is an average of all the reliable readings.

Having found enough reliable inputs to perform its calculations, the chain first calculates two temperature signals which are equal to the calculated average temperature plus the output of two rate blocks. These are called the runback and hold signals. Having calculated these runbacks and hold temperature signals, the program now proceeds to calculate a temperature reference.

Before calculating a temperature reference the program checks the logical variable for the breaker status to determine if the breaker is open or closed. If the breaker is closed, a starting temperature reference is calculated as a function of combustor shell pressure and the program proceeds to label 114. If the breaker is closed indicating that the gas turbine is generating load, an appropriate load temperature reference is generated. The load temperature reference is formed by first generating a base load temperature reference as a function of combustor shell pressure. A check is then made to see if peak load was selected through the operator's panel peak button, and if this is so, a temporary variable is set equal to the difference between the base load temperature reference and the peak load temperature reference. If either base has been selected or if no selections were made, the temporary variable is set to zero. This temporary variable becomes the demand point for a ramp generator which moves its output toward this value. The ramp generator output is, in turn, added to the base load temperature reference previously generated. Thus, the offset is slowly ramped between base and peak preventing sudden jumps in the reference level.

Having formed a reference, the chain proceeds to check the logical variable L2979 to see if blade path temperature control has been selected, and if so a check is made to see where the actual temperature is in relation to the previously generated reference and an appropriate ramp rate is calculated as a function of this difference so that fuel will move in a direction so as to eliminate the error.

Before exiting the chain, check for the existence of hold and runback conditions by comparing the hold and runback signals against the temperature reference. If either the hold or the runback signal exceed the temperature reference, the appropriate hold or runback flag is set providing that certain conditions exist such as: that there are not already existing holds or runbacks or that, in the case of the hold, the generator breaker has been closed. The chain then checks to see whether the temperature has exceeded alarm or trip limits. If either is exceeded, the appropriate action is taken. In the case of an alarm limit an alarm logical variable is set true; in the case of a trip being exceeded the trip logical variable is set true. These will be acted later upon by other chains. The blade path exhaust temperature control chain 8001 ends with a bid for the IGV control chain 8000.

INDEX OF VARIABLES FOR DRAWINGS

FIG. 18

| | |
|---|---|
| V2050 | SPEED |
| V2987 | SELECTED SPEED |
| V2951 | STOP COUNTER |
| V6980 | START TIMER |
| V2104 | GENERATOR MW |
| L2994 | BREAKER FLIPFLOP |
| L2972 | REQUEST FOR AUTO SYNC |
| L6007 | SYNC SPEED LAMP |
| L2974 | REQUEST FOR MANUAL SYNC |
| L6006 | START DEV OFF LAMP |
| L6069 | COORD LAMP |
| L2082 | MASTER 4X RELAY C1 |
| L2081 | HOT STANDBY C1 |
| L2256 | START C0 |
| L2966 | AUTO START |
| L2976 | MANUAL FUEL VALVE |
| L2260 | STOP C0 |
| L2968 | AUTO STOP |
| L6093 | NORMAL STOP LAMP |
| L2993 | SPEED UNRELIABLE |
| L2995 | MW UNRELIABLE |
| K2974 | SYNC SPEED |
| K2960 | MAX. STOP COUNT |
| 8001 | (BP-EXHAUST) TEMPERATURE CONTROL |

FIG. 19

| | |
|---|---|
| V2017 | BLADE PATH T. GROUP1 AVG. |
| V2018 | BLADE PATH T. GROUP2 AVG. |
| V2019 | BLADE PATH T. GROUP3 AVG. |
| V2080 | COMP. DISCH. PRESS. P2C |
| V2999 | BPT CONTROL SIGNAL |
| V2998 | BPT RUNBACK SIGNAL |
| V2997 | BPT HOLD SIGNAL |
| V2996 | P2C LOAD-CHARACTERIZED BPT |
| V2995 | BASE/PEAK BPT BIAS RAMP |
| V2986 | BPT RUNBACK LIMIT |
| V2985 | BPT HOLD LIMIT |
| V2984 | P2C SPEED-CHARACTERIZED BPT |
| V2970 | DELAYED BPT-HOLD CONTROLLER |
| V2971 | DELAYED BPT-RUNBACK CONTROLLER |
| V2961 | EX.TEMP. CONTROL SIGNAL |
| V2956 | EX.TEMP. TIMER |
| V2957 | EX. TEMP. RAMP |
| V2958 | EX. TEMP. RAMP RATE |
| V2977 | BPT BIASED REF |
| L2991 | BPT OR P2C UNRELIABLE |
| L2990 | BPT RUNBACK |
| L2994 | BREAKER FLIPFLOP |
| L2014 | BASE BUTTON C1 |
| L2015 | PEAK BUTTON C1 |
| L2135 | HOLD LAMP |
| L2986 | COMPUTED HOLD |
| L2983 | BPT HIGH ALARM |
| L2241 | BPT NOT TRIPPED C0 |
| L2979 | EX. TEMP. CONTROL ACTIVE |
| L2258 | TEMP. CONTROL MONITOR LAMP |
| K2984 | BPT DEADBAND |
| K2983 | BASE/PEAK RAMP RATE |
| K2982 | BPT PEAK OFFSET |
| K1981 | BPT RUNBACK DEADBAND |
| K2986 | BPT HOLD DEADBAND |
| K2967 | BPT TRIP LEVEL |
| K2962 | BPT/EX. TEMP. NEGATIVE RATE |
| K2963 | BPT/EX. TEMP. POSITIVE RATE |
| K2961 | EX. TEMP. MAX. TIME COUNT |
| K2890 | P2C-BPT LOADING ARRAY |
| K2880 | P2C-BPT STARTING ARRAY |
| K2940 | BPT RUNBACK CONTROL ARRAY |
| K2930 | BPT HOLD CONTROL ARRAY |
| K2985 | BPT REF BIAS |
| K2996 | MAX EX. TEMP RAMP |
| 6000 | INLET GUIDE VANE CONTROL |

I claim:

1. In association with a combined cycle electric power plant including at least one gas turbine having a variable inlet guide vane assembly and actuating means therefor, and control means for regulating overall plant operation wherein signals representative of predetermined turbine parameters are generated, control apparatus for automatically modulating the position of the inlet guide vane assembly, said apparatus comprising:

a. first signal characterizing means, responsively coupled to the plant control means, for generating a first characterized inlet guide vane positioning signal in accordance with a predetermined correspondence between values of a first turbine parameter signal and positions of the inlet guide vane assembly;

b. second signal characterizing means, responsively coupled to the plant control means, for generating a second characterized inlet guide vane positioning signal in accordance with a predetermined correspondence between values of a second turbine parameter signal and positions of the inlet guide vane assembly; and c. signal selection means, coupled between said first and second signal characterizing means and the inlet guide vane assembly actuating means, for selecting in accordance with a predetermined criteria one of said first and second characterized inlet guide vane assembly positioning signals to the inlet guide vane assembly actuating means.

2. The control apparatus according to claim 1 wherein said first and second turbine parameter signals are respectively representative of turbine loading and a blade path temperature error.

3. The control apparatus according to claim 1 which further comprises:

a. third signal characterizing means, responsively coupled between the plant control means and the inlet guide vane assembly, for generating a third characterized inlet guide vane positioning signal in accordance with a predetermined correspondence between values of a third turbine parameter signal and positions of the inlet guide vane assembly; and b. switching means, responsively coupled to said first, second and third signal characterizing means, for enabling said third signal characterizing means and disenabling said first and second signal characterizing means whenever said third turbine parameter signal is below a predetermined value and for disenabling said third signal characterizing means and enabling said first and second signal characterizing means whenever said third turbine parameter signal is above said predetermined value.

4. The control apparatus according to claim 3 wherein said first, second and third turbine parameter signals are respectively representative of turbine loading, a blade path temperature error and turbine speed.

5. The control apparatus according to claim 1 which further comprises damping means, responsively coupled between said signal selection means and the inlet guide vane assembly actuating means, for reducing to a predetermined value the rate of change of any signal selected by said signal selection means which exceeds a predetermined rate.

6. The control apparatus according to claim 3 which further comprises damping means, responsively coupled between said signal selection means and the inlet guide vane assembly actuating means, for reducing to a predetermined value the rate of change of any signal selected by said signal selection means which exceeds a predetermined value.

7. In association with a gas turbine having a variable inlet guide vane assembly and actuating means therefor, control apparatus for automatically modulating the position of the inlet guide vane assembly, said apparatus comprising:

a. sensing means, responsively associated with the gas turbine for developing signals representative of predetermined turbine parameters;

b. first signal characterizing means, responsively coupled to said sensing means, for generating a first characterized inlet guide vane positioning signal in accordance with a predetermined correspondence between values of a first turbine parameter signal and positions of the inlet guide vane assembly;

c. second signal characterizing means, responsively coupled to said sensing means, for generating a second characterized inlet guide vane positioning signal in accordance with a predetermined correspondence between values of a second turbine parameter signal and positions of the inlet guide vane assembly; and d. signal selection means, coupled between said first and second signal characterizing means and the inlet guide vane assembly actuating means, for selecting in accordance with a predetermined criteria one of said first and second characterized inlet guide vane assembly positioning signals for utilization by the inlet guide vane actuating means.

8. The control apparatus according to claim 7 wherein said first and second turbine parameter signals are respectively representative of turbine loading and a blade path temperature error.

9. The control apparatus according to claim 7 which further comprises:

a. third signal characterizing means, responsively coupled to said sensing means, for generating a third characterized inlet guide vane positioning signal in accordance with a predetermined correspondence between values of a third turbine parameter signal and positions of the inlet guide vane assembly; and b. switching means, responsively coupled to said first, second and third signal characterizing means, for enabling said third signal characterizing means and disenabling said first and second signal characterizing means whenever said third turbine parameter signal is below a predetermined value and for disenabling said third signal characterizing means and enabling said first and second signal characterizing means whenever said third parameter signal is above said predetermined value.

10. The control apparatus according to claim 9 wherein said first, second and third turbine parameter signals are respectively representative of turbine load, a blade path temperature error and turbine speed.

11. The control apparatus according to claim 7 which further comprises damping means, responsively coupled between said signal selection means and the inlet guide vane assembly actuating means, for reducing to a predetermined value the rate of change of any signal selected by said signal selection means which exceeds a predetermined rate.

12. The control apparatus according to claim 9 which further comprises damping means, responsively coupled between said signal selection means and the inlet guide vane assembly actuating means, for reducing to a predetermined value the rate of change of any signal selected by said signal selection means which exceeds a predetermined value.

13. In association with a combined cycle electric power plant including at least one gas turbine having a variable inlet guide vane assembly and actuating means therefor, and control means for regulating overall plant operation wherein signals representative of predetermined turbine parameters are generated, control apparatus for modulating the position of the inlet guide vane assembly, said apparatus comprising:

a. means for automatically modulating the position of the inlet guide vane assembly including,
   1. first signal characterizing means, responsively coupled to the plant control means for generating a first characterized inlet guide vane positioning signal in accordance with a predetermined correspondence between values of a first turbine parameter signal and positions of the inlet guide vane assembly,
   2. second signal characterizing means, responsively coupled to the plant control means, for generating a second characterized inlet guide vane positioning signal in accordance with a predetermined correspondence between values of a second turbine parameter signal and positions of the inlet guide vane assembly, and
   3. signal selection means, coupled between said first and second signal characterizing means and the inlet guide vane assembly actuating means, for selecting in accordance with a predetermined criteria one of said first and second characterized inlet guide vane assembly positioning signals to the inlet guide vane assembly actuating means,
b. means for manually initiating and generating a signal for modulation of the position of the inlet guide vane assembly as a backup to said automatic modulating means; and
c. interfacing means, responsively coupled between the outputs of said automatic and said manual modulating means, for insuring forwarding of a control signal by the inlet guide vane assembly actuating means from either of said automatic or said manual modulating means.

14. The control apparatus according to claim 13 wherein said manual modulating means is responsively coupled to the plant operating means and further includes means for characterizing said positioning signal generated by said manual actuating means in accordance with a predetermined correspondence between values of a third turbine parameter signal and positions of the inlet guide vane assembly.

15. The control apparatus according to claim 14 wherein said automatic modulating means further includes means, responsively coupled between said signal selection means and said interfacing means, for constantly tracking the value of the positioning signal forwarded by said interfacing means to the inlet guide vane assembly actuating means and for forcing the output of said automatic modulating means to be driven thereto.

16. The control apparatus according to claim 15 which further comprises:
a. third signal characterizing means, responsively coupled between the plant control means and the inlet guide vane assembly, for generating a third characterized inlet guide vane positioning signal in accordance with a predetermined correspondence between values of a fourth turbine parameter signal and positions of the inlet guide vane assembly; and
b. switching means, responsively coupled to said first, second and third signal characterizing means, for enabling said third signal characterizing means and disenabling said first and second signal characterizing means whenever said fourth turbine parameter signal is below a predetermined value and for disenabling said third signal characterizing means and enabling said first and second signal characterizing means whenever said fourth turbine parameter signal is above said predetermined value.

17. The control apparatus according to claim 16 which further comprises damping means, responsively coupled between said signal selection means and said tracking means, for reducing to a predetermined value the rate of change of any signal selected by said signal selection means which exceeds a predetermined rate.

18. The control apparatus according to claim 13 wherein said first and second turbine parameter signals are respectively representative of turbine loading and a blade path temperature error.

19. The control apparatus according to claim 13 wherein said automatic modulating means further includes means, responsively coupled between said signal selection means and said interfacing means, for constantly tracking the value of the positioning signal forwarded by said interfacing means to the inlet guide vane assembly actuating means and for forcing the output of said automatic modulating means to be driven thereto.

20. The control apparatus according to claim 19 which further comprises:
a. third signal characterizing means, responsively coupled between the plant control means and the inlet guide vane assembly, for generating a third characterized inlet guide vane positioning signal in accordance with a predetermined correspondence between values of a fourth turbine parameter signal and positions of the inlet guide vane assembly; and
b. switching means, responsively coupled to said first, second and third signal characterizing means, for enabling said third signal characterizing means and disenabling said first and second signal characterizing means whenever said fourth turbine parameter signal is below a predetermined value and for disenabling said third signal characterizing means and enabling said first and second signal characterizing means whenever said fourth turbine parameter signal is above said predetermined value.

21. The control apparatus according to claim 20 which further comprises damping means, responsively coupled between said signal selection means and said tracking means, for reducing to a predetermined value the rate of change of any signal selected by said signal selection means which exceeds a predetermined rate.

22. The control apparatus according to claim 19 which further comprises damping means, responsively coupled between said signal selection means and said tracking means, for reducing to a predetermined value the rate of change of any signal selected by said signal selection means which exceeds a predetermined rate.

23. The control apparatus according to claim 14 which further comprises:
a. third signal characterizing means, responsively coupled between the plant control means and the inlet guide vane assembly, for generating a third characterized inlet guide vane positioning signal in accordance with a predetermined correspondence between values of a fourth turbine parameter signal and positions of the inlet guide vane assembly; and
b. switching means, responsively coupled to said first, second and third signal characterizing means, for enabling said third signal characterizing means and disenabling said first and second signal characterizing means whenever said fourth turbine parameter signal is below a predetermined value and for disenabling said third signal characterizing means and enabling said first and second signal characterizing means whenever said fourth turbine parameter signal is above said predetermined value.

24. The control apparatus according to claim 15 which further comprises damping means, responsively coupled between said signal selection means and said tracking means, for reducing to a predetermined value the rate of change of any signal selected by said signal selection means which exceeds a predetermined rate.

25. The control apparatus according to claim 13 which further comprises:
   a. third signal characterizing means, responsively coupled between the plant control means and the inlet guide vane assembly, for generating a third characterized inlet guide vane positioning signal in accordance with a predetermined correspondence between values of a fourth turbine parameter signal and positions of the inlet guide vane assembly; and
   b. switching means, responsively coupled to said first, second and third signal characterizing means, for enabling said third signal characterizing means and disenabling said first and second signal characterizing means whenever said fourth turbine parameter signal is below a predetermined value and for disenabling said third signal characterizing means and enabling said first and second signal characterizing means whenever said fourth turbine parameter signal is above said predetermined value.

26. The control apparatus according to claim 25 which further comprises damping means, responsively coupled between said signal selection means and said tracking means, for reducing to a predetermined value the rate of change of any signal selected by said signal selection means which exceeds a predetermined rate.

27. The control apparatus according to claim 13 which further comprises damping means, responsively coupled between said signal selection means and the inlet guide vane assembly actuating means, for reducing to a predetermined value the rate of change of any signal selected by said signal selection means which exceeds a predetermined rate.

28. In association with a gas turbine having a variable inlet guide vane assembly and actuating means therefor, control apparatus for modulating the position of the inlet guide vane assembly, said apparatus comprising:
   a. sensing means, responsively associated with the gas turbine for developing signals representative of predetermined turbine parameters;
   b. means for automatically modulating the position of the inlet guide vane assembly including,
      1. first signal characterizing means, responsively coupled to said sensing means, for generating a first characterized inlet guide vane positioning signal in accordance with a predetermined correspondence between values of a first turbine parameter signal and positions of the inlet guide vane assembly,
      2. second signal characterizing means, responsively coupled to said sensing means, for generating a second characterized inlet guide vane positioning signal in accordance with a predetermined correspondence between values of a second turbine parameter signal and positions of the inlet guide vane assembly, and
      3. signal selection means, coupled between said first and second signal characterizing means and the inlet guide vane assembly actuating means, for selecting in accordance with a predetermined criteria one of said first and second characterized inlet guide vane assembly positioning signals for utilization by the inlet guide vane actuating means,
   c. means for manually initiating and generating a signal for modulation of the position of the inlet guide vane assembly as a backup to said automatic modulating means; and
   d. intefacing means, responsively coupled between the outputs of said automatic and said manual modulating means, for insuring forwarding of a control signal by the inlet guide vane assembly actuating means from either of said automatic or said manual modulating means.

29. The control apparatus according to claim 28 wherein said manual modulating means is responsively coupled to the plant operating means and further includes means for characterizing said positioning signal generated by said manual actuating means in accordance with a predetermined correspondence between values of a third turbine parameter signal and positions of the inlet guide vane assembly.

30. The control apparatus according to claim 29 wherein said automatic modulating means further includes means, responsively coupled between said signal selection means and said interfacing means, for constantly tracking the value of the positioning signal forwarded by said interfacing means to the inlet guide vane assembly actuating means and for forcing the output of said automatic modulating means to be driven thereto.

31. The control apparatus according to claim 30 which further comprises:
   a. third signal characterizing means, responsively coupled between the plant control means and the inlet guide vane assembly, for generating a third characterized inlet guide vane positioning signal in accordance with a predetermined correspondence between values of a fourth turbine parameter signal and positions of the inlet guide vane assembly; and
   b. switching means, responsively coupled to said first, second and third signal characterizing means, for enabling said third signal characterizing means and disenabling said first and second signal characterizing means whenever said fourth turbine parameter signal is below a predetermined value for disenabling said third signal characterizing means and enabling said first and second signal characterizing means whenever said fourth turbine parameter signal is above said predetermined value.

32. The control apparatus according to claim 31 which further comprises damping means, responsively coupled between said signal selection means and said tracking means, for reducing to a predetermined value the rate of change of any signal selected by said signal selection means which exceeds a predetermined rate.

33. The control apparatus according to claim 28 wherein said first and second turbine parameter signals are respectively respresentative of turbine loading and a blade path temperature error.

34. The control apparatus according to claim 28 wherein said automatic modulating means further includes means, responsively coupled between said signal selection means and said interfacing means, for constantly tracking the value of the positioning signal forwarded by said interfacing means to the inlet guide vane assembly actuating means and for forcing the output of said automatic modulating means to be driven thereto.

35. The control apparatus according to claim 34 which further comprises:
   a. third signal characterizing means, responsively coupled between the plant control means and the inlet guide vane assembly, for generating a third characterized inlet guide vane positioning signal in accordance with a predetermined correspondence between values of a fourth turbine parameter signal and positions of the inlet guide vane assembly; and
   b. switching means, responsively coupled to said first, second and third signal characterizing means, for enabling said third signal characterizing means and disenabling said first and second signal characterizing means whenever said fourth turbine parameter signal is below a predetermined value and for disenabling said third signal characterizing means and enabling said first and second signal characterizing means whenever said fourth turbine parameter signal is above said predetermined value.

36. The control apparatus according to claim 35 which further comprises damping means, responsively coupled between said signal selection means and said tracking means, for reducing to a predetermined value the rate of change of any signal selected by said signal selection means which exceeds a predetermined rate.

37. The control apparatus according to claim 34 which further comprises damping means, responsively coupled between said signal selection means and said tracking means, for reducing to a predetermined value the rate of change of any signal selected by said signal selection means which exceeds a predetermined rate.

38. The control apparatus according to claim 29 which further comprises:
   a. third signal characterizing means, responsively coupled between the plant control means and the inlet guide vane assembly, for generating a third characterized inlet guide vane positioning signal in accordance with a predetermined correspondence between values of a fourth turbine parameter signal and positions of the inlet guide vane assembly; and
   b. switching means, responsively coupled to said first, second and third signal characterizing means, for enabling said third signal characterizing means and disenabling said first and second signal characterizing means whenever said fourth turbine parameter signal is below a predetermined value and for disenabling said third signal characterizing means and enabling said first and second signal characterizing means whenever said fourth turbine parameter signal is above said predetermined value.

39. The control apparatus according to claim 30 which further comprises damping means, responsively coupled between said signal selection means and said tracking means, for reducing to a predetermined value the rate of change of any signal selected by said signal selection means which exceeds a predetermined rate.

40. The control apparatus according to claim 28 which further comprises:
   a. third signal characterizing means, responsively coupled between the plant control means and the inlet guide vane assembly, for generating a third characterized inlet guide vane positioning signal in accordance with a predetermined correspondence between values of a fourth turbine parameter signal and positions of the inlet guide vane assembly; and
   b. switching means, responsively coupled to said first, second and third signal characterizing means, for enabling said third signal characterizing means and disenabling said first and second signal characterizing means whenever said fourth turbine parameter signal is below a predetermined value and for a disenabling said third signal characterizing means and enabling said first and second signal characterizing means whenever said fourth turbine parameter signal is above said predetermined value.

41. The control apparatus according to claim 40 which further comprises damping means, responsively coupled between said signal selection means and said tracking means, for reducing to a predetermined value the rate of change of any signal selected by said signal selection means which exceeds a predetermined rate.

42. The control apparatus according to claim 28 which further comprises damping means, responsively coupled between said signal selection means and the inlet guide vane assembly actuating means, for reducing to a predetermined value the rate of change of any signal selected by said signal selection means which exceeds a predetermined rate.

* * * * *